(12) United States Patent
Sudoh et al.

(10) Patent No.: US 11,237,406 B2
(45) Date of Patent: Feb. 1, 2022

(54) ZOOM LENS SYSTEM AND IMAGING APPARATUS PROVIDED WITH THE SAME

(71) Applicant: Ricoh Company, Ltd., Tokyo (JP)

(72) Inventors: Yoshifumi Sudoh, Tokyo (JP); Tomoya Koga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 150 days.

(21) Appl. No.: 16/575,726

(22) Filed: Sep. 19, 2019

(65) Prior Publication Data

US 2020/0174269 A1 Jun. 4, 2020

(30) Foreign Application Priority Data

Nov. 30, 2018 (JP) .............................. JP2018-224783

(51) Int. Cl.
| | |
|---|---|
| *G02B 27/64* | (2006.01) |
| *G02B 15/14* | (2006.01) |
| *G02B 15/20* | (2006.01) |
| *G03B 5/04* | (2021.01) |
| *G02B 15/163* | (2006.01) |

(52) U.S. Cl.
CPC ....... *G02B 27/646* (2013.01); *G02B 15/1461* (2019.08); *G02B 15/163* (2013.01); *G02B 15/20* (2013.01); *G03B 5/04* (2013.01); *G03B 2205/0015* (2013.01)

(58) Field of Classification Search
CPC .............. G02B 27/646; G02B 15/1461; G02B 15/1451; G02B 15/14; G02B 15/1431; G02B 15/144; G02B 15/20; G02B 13/0045; G02B 9/34; G02B 9/60; G02B 9/64

USPC ................ 359/557, 686, 689, 713–714, 746, 359/750–756, 764, 772, 784
See application file for complete search history.

(56) References Cited

U.S. PATENT DOCUMENTS

| | | | |
|---|---|---|---|
| 2011/0228408 A1 | 9/2011 | Sudoh | |
| 2014/0218800 A1* | 8/2014 | Li | G02B 27/646 |
| | | | 359/557 |
| 2016/0018630 A1* | 1/2016 | Ori | G02B 15/163 |
| | | | 359/557 |

FOREIGN PATENT DOCUMENTS

| | | |
|---|---|---|
| JP | 2011-197336 | 10/2011 |
| JP | 2014-145960 | 8/2014 |
| JP | 2015-191008 | 11/2015 |
| JP | 2017-207730 | 11/2017 |

\* cited by examiner

*Primary Examiner* — Kristina M Deherrera
(74) *Attorney, Agent, or Firm* — Xsensus LLP

(57) ABSTRACT

A zoom lens system includes a first lens group having positive refractive power; a second lens group having negative refractive power; and a rear group, the first lens group, arranged in that order from an object side. The second lens group includes a second lens group-a having negative refractive power and a second lens group-b having negative refractive power arranged in that order from the object side. During a change in a focus from a short focal length end to a long focal length end to change a magnification power, a distance between the first lens group and the second lens group-a increases, a distance between the second lens group-a and the second lens group-b is changeable or stationary, and a distance between the second lens group-b and the rear lens group decreases.

13 Claims, 50 Drawing Sheets

FIG. 2
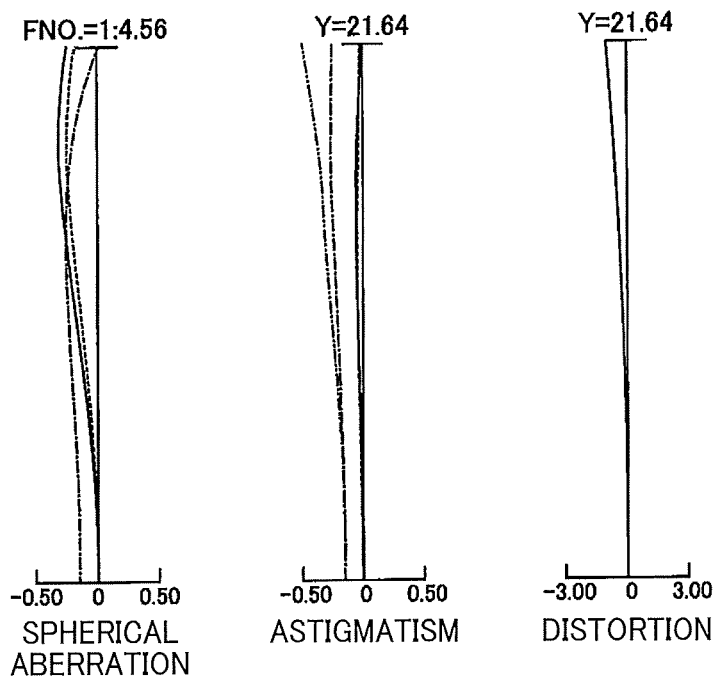
SPHERICAL ABERRATION · ASTIGMATISM · DISTORTION
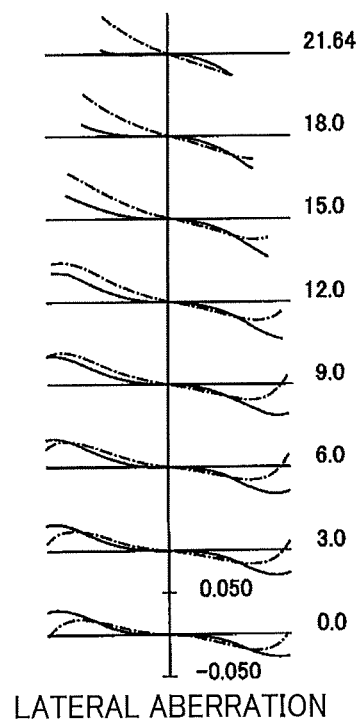
LATERAL ABERRATION FIG. 3
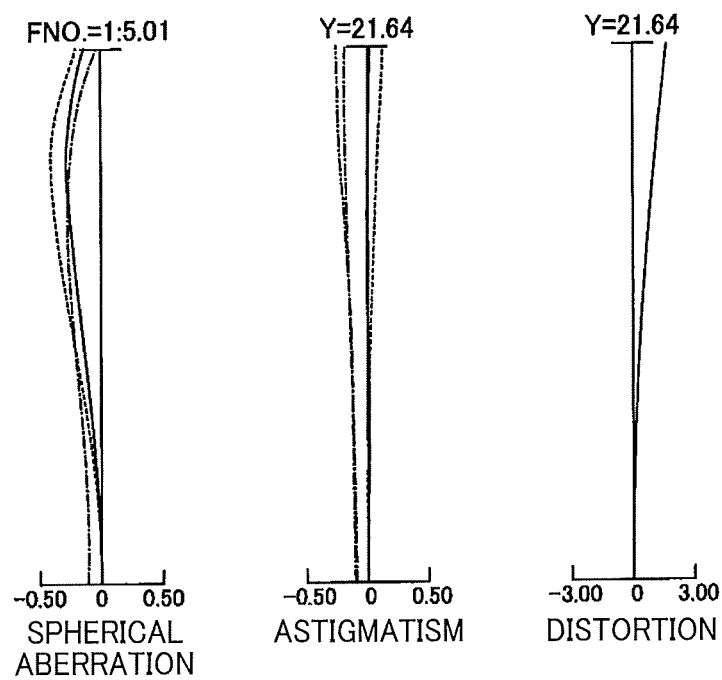
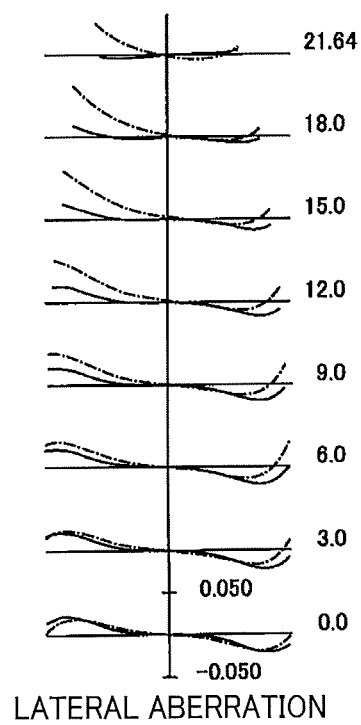
LATERAL ABERRATION

FIG. 4
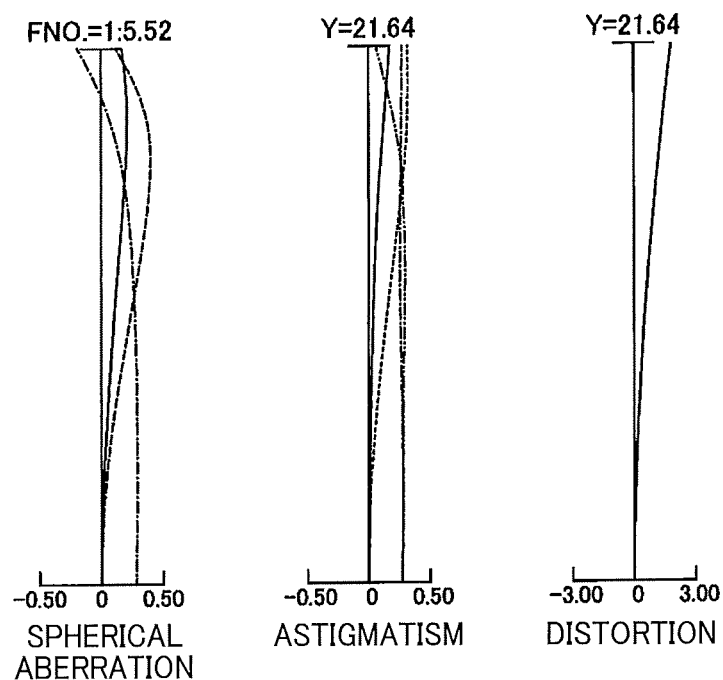
SPHERICAL ABERRATION  ASTIGMATISM  DISTORTION
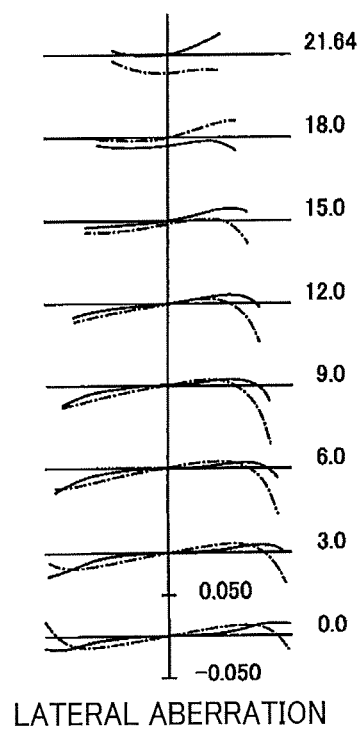
LATERAL ABERRATION FIG. 6
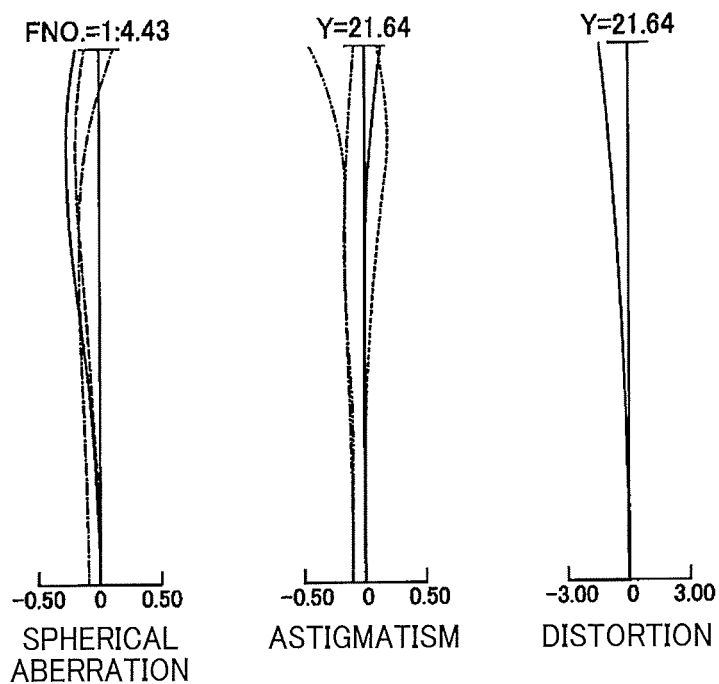
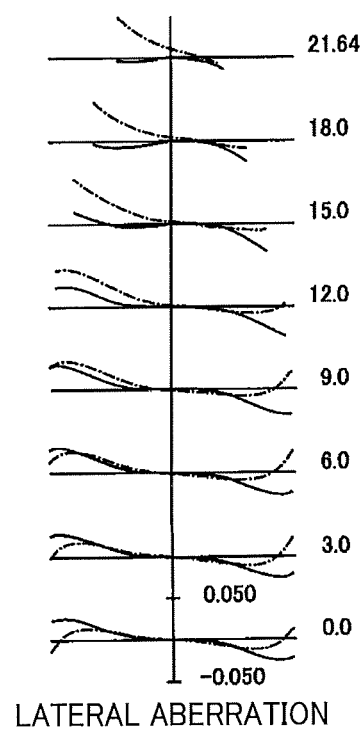
LATERAL ABERRATION

FIG. 7
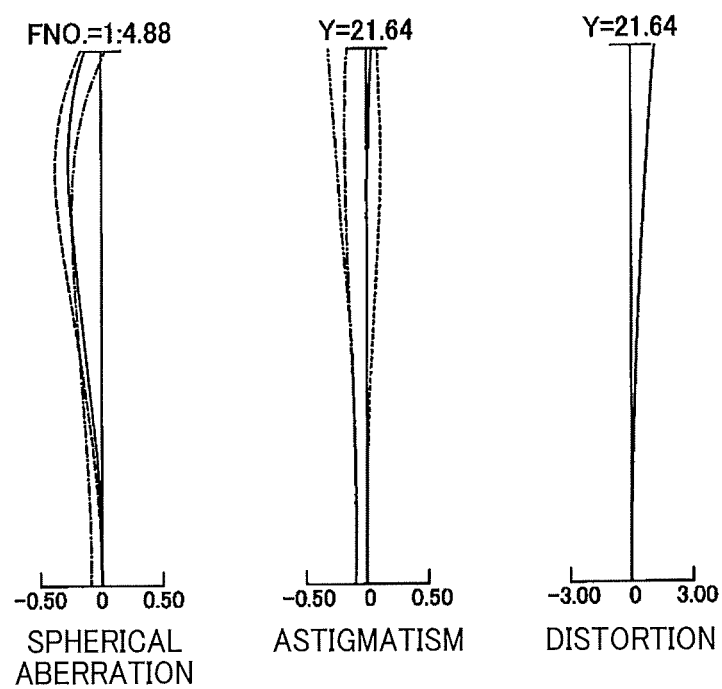
SPHERICAL ABERRATION    ASTIGMATISM    DISTORTION
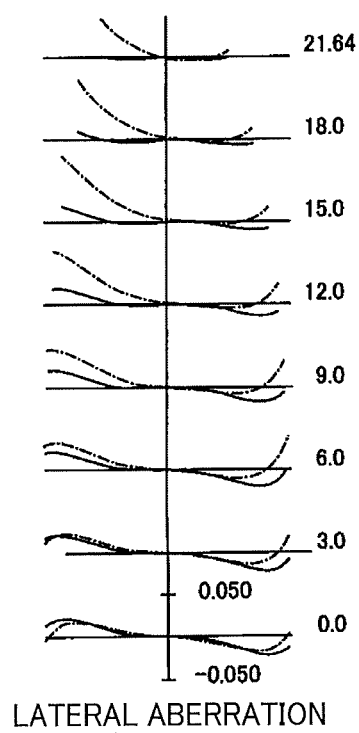
LATERAL ABERRATION

FIG. 8
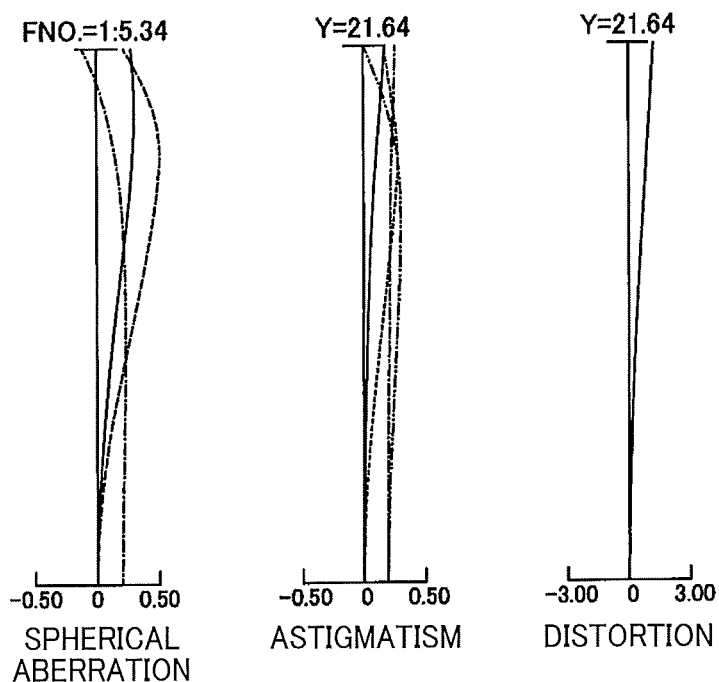
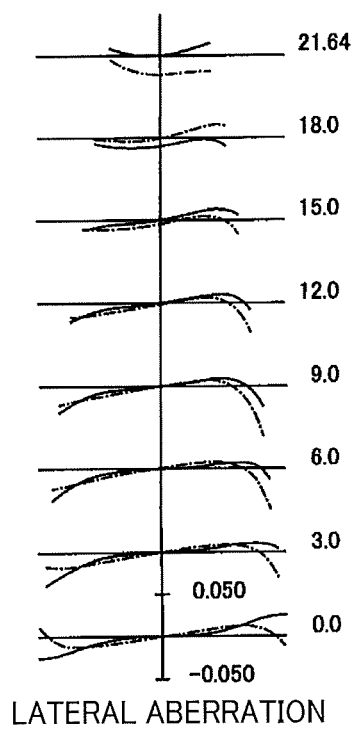
LATERAL ABERRATION

FIG. 10
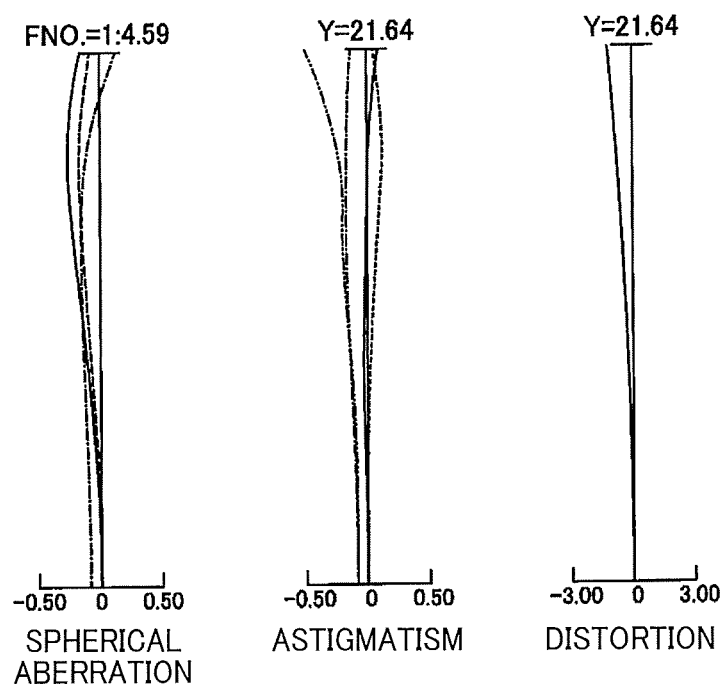
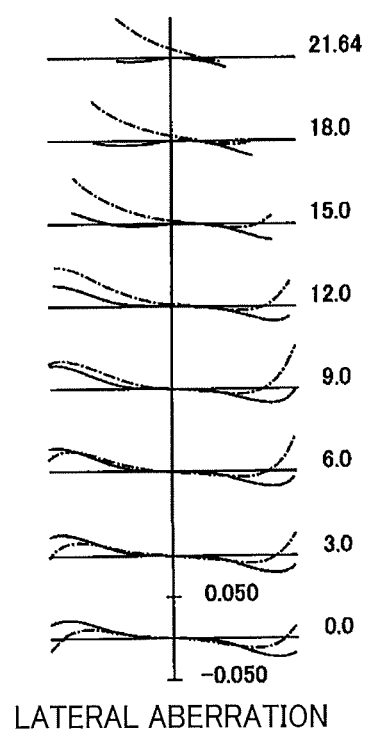
LATERAL ABERRATION

FIG. 11
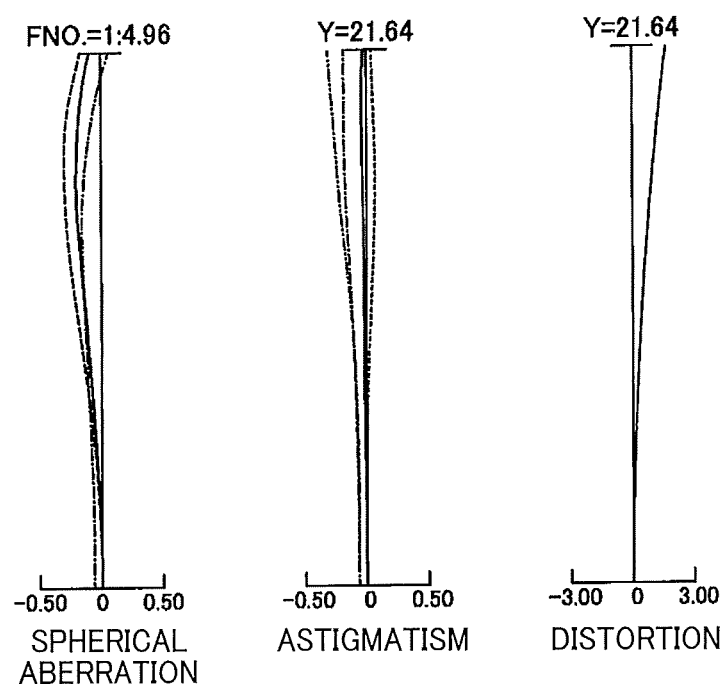
SPHERICAL ABERRATION | ASTIGMATISM | DISTORTION
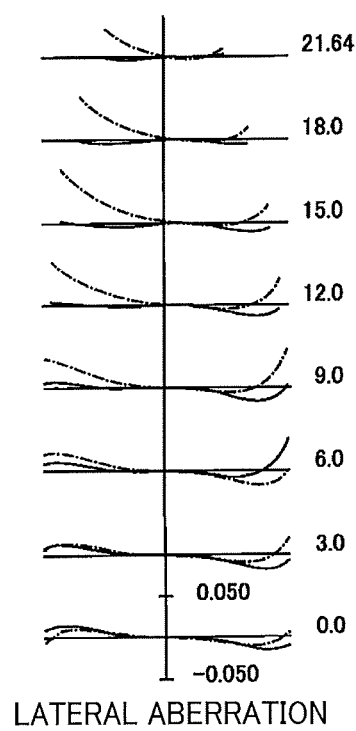
LATERAL ABERRATION

FIG. 12
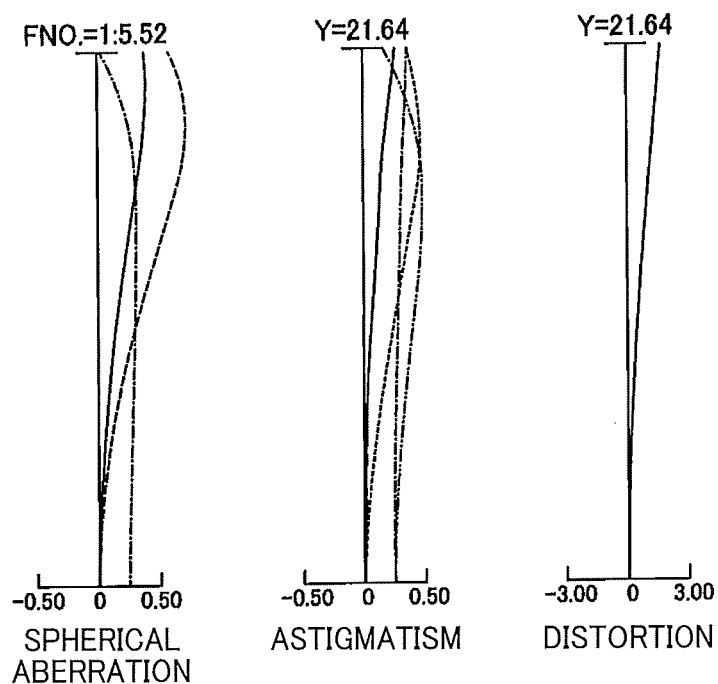
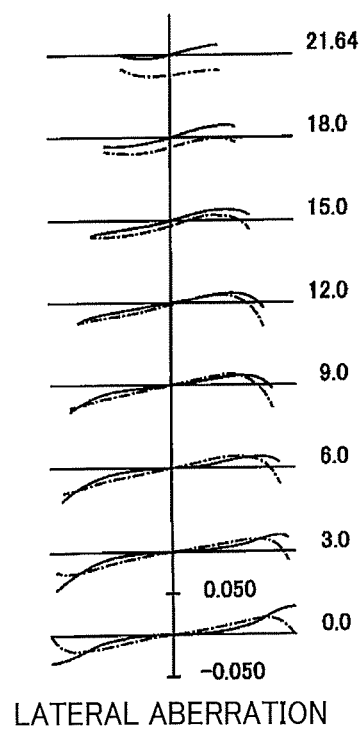
LATERAL ABERRATION

FIG. 14
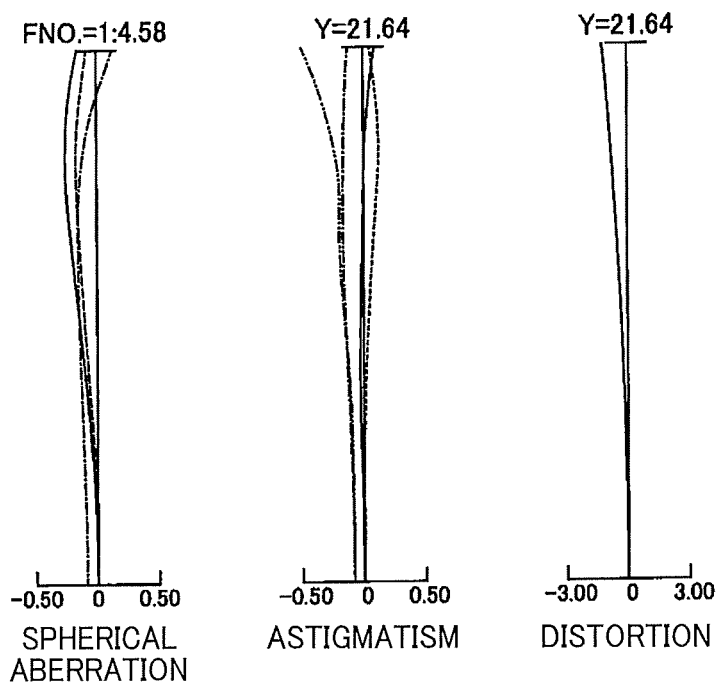
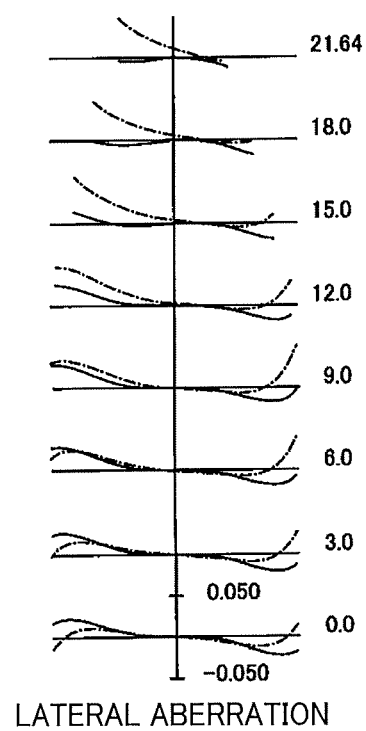
LATERAL ABERRATION

FIG. 15
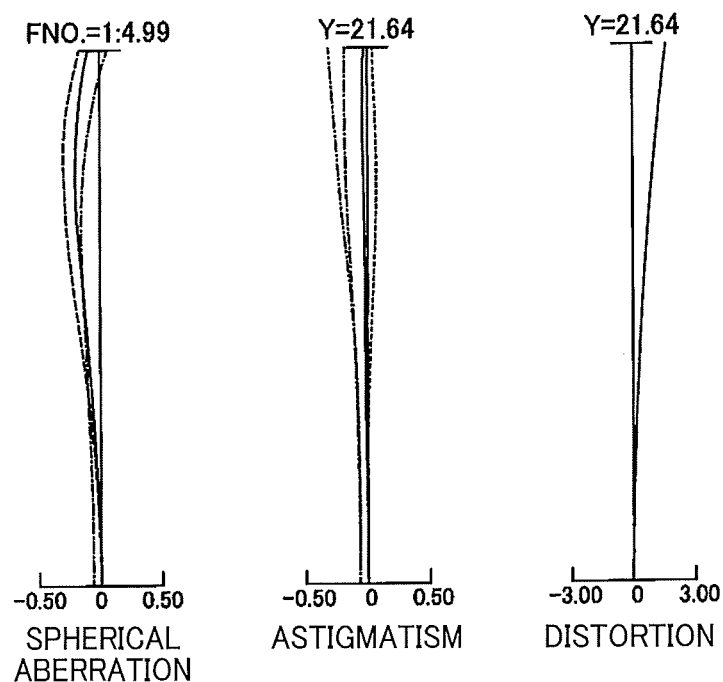
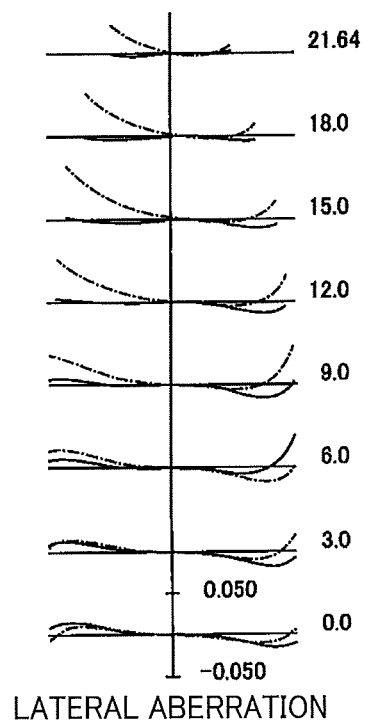
LATERAL ABERRATION

FIG. 16
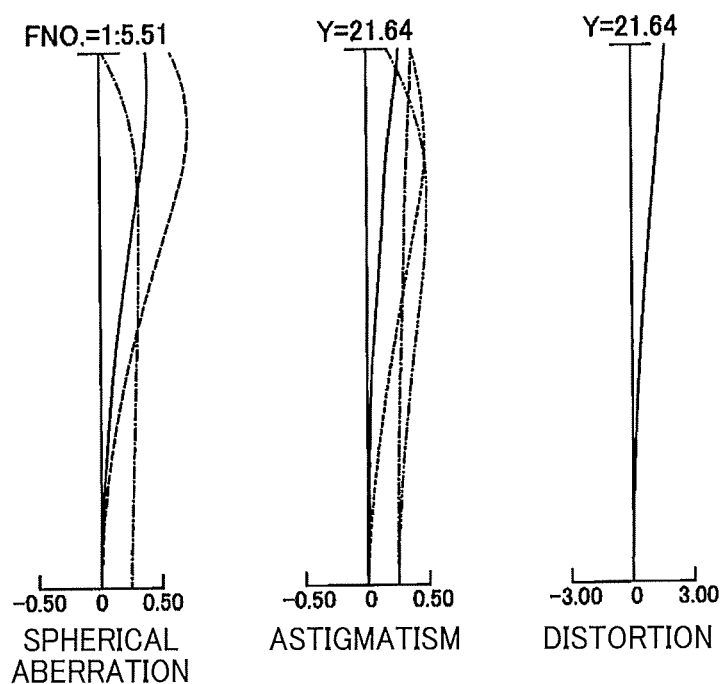
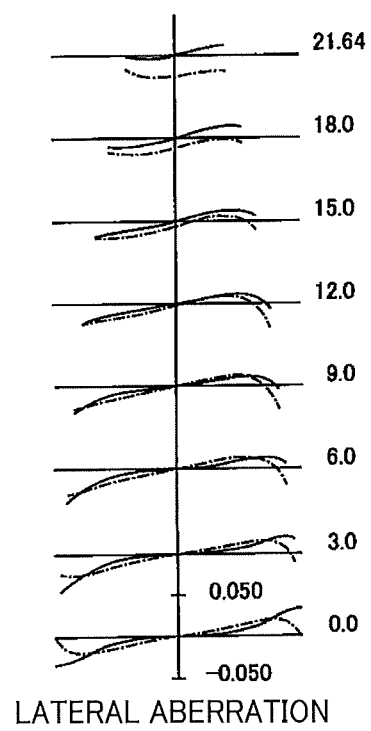
LATERAL ABERRATION

FIG. 18
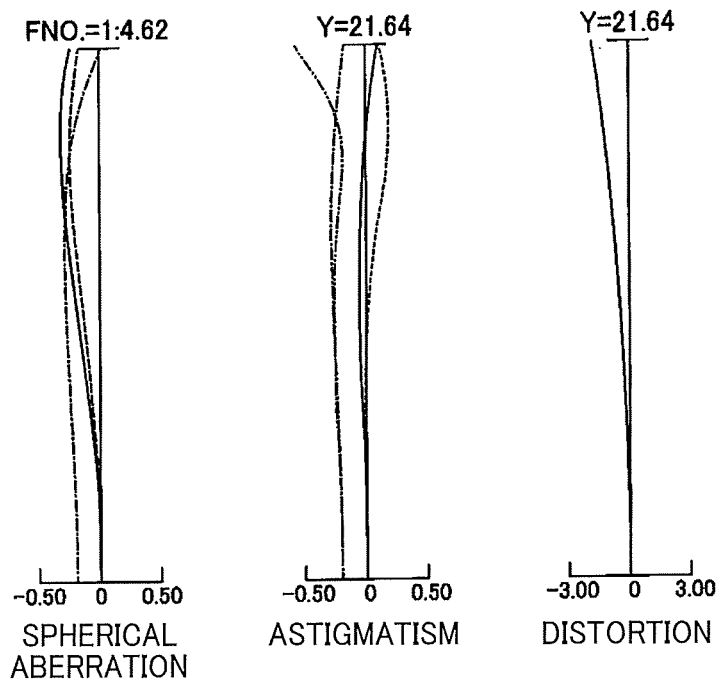
SPHERICAL ABERRATION  ASTIGMATISM  DISTORTION
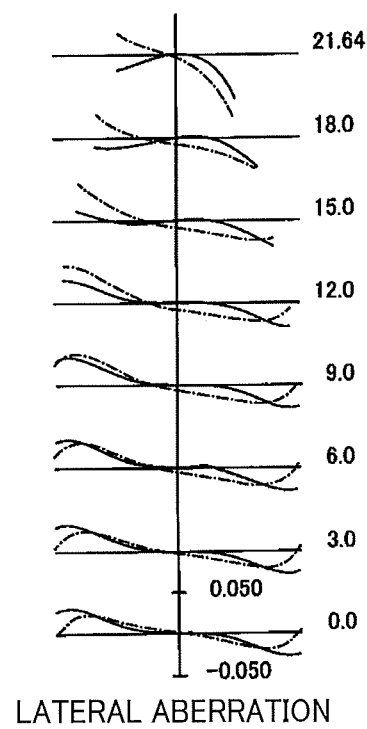
LATERAL ABERRATION

FIG. 19
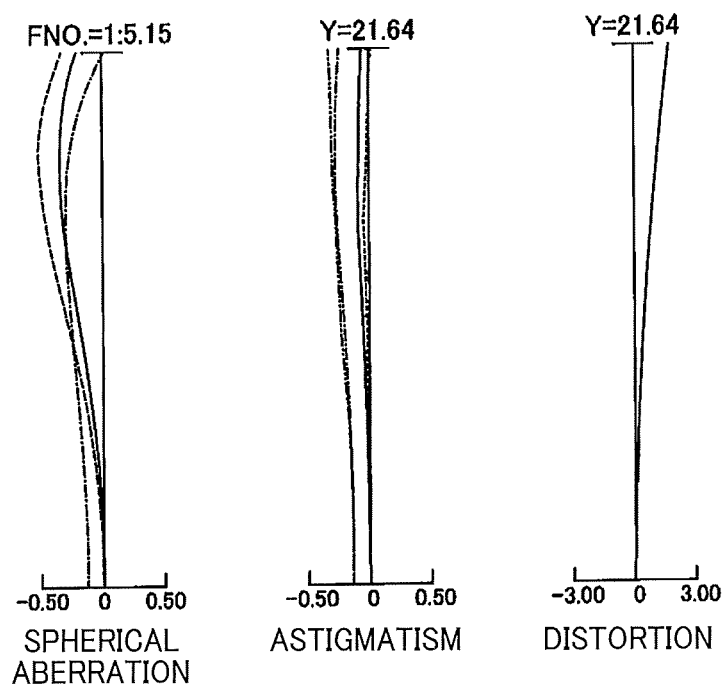
SPHERICAL ABERRATION   ASTIGMATISM   DISTORTION
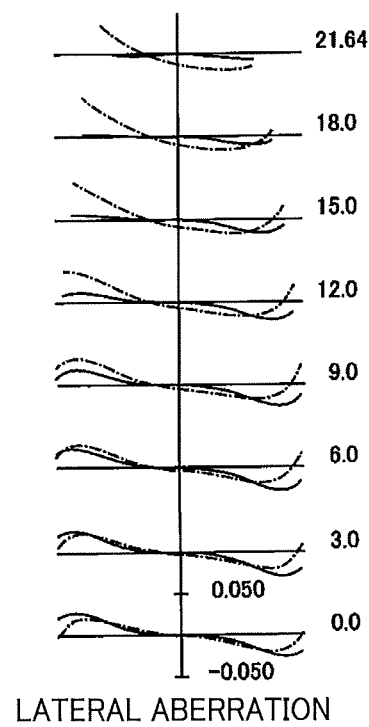
LATERAL ABERRATION

FIG. 20
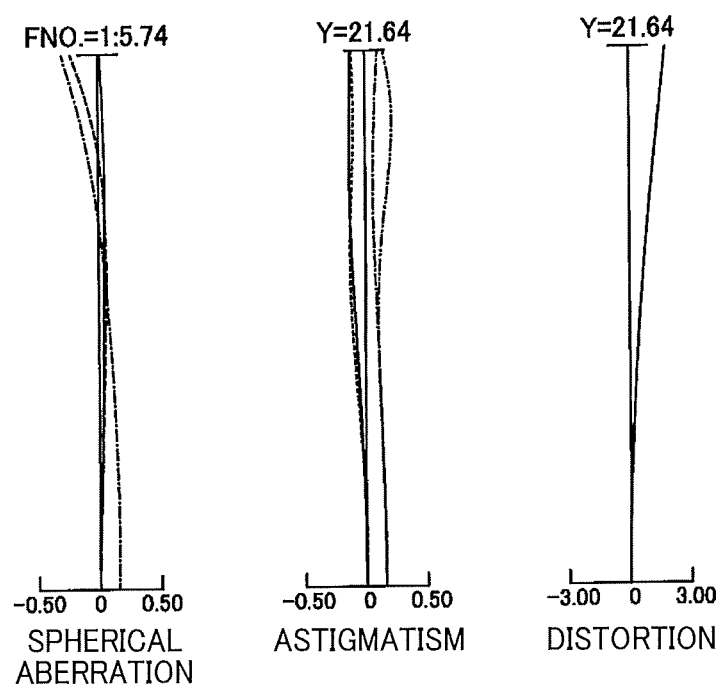
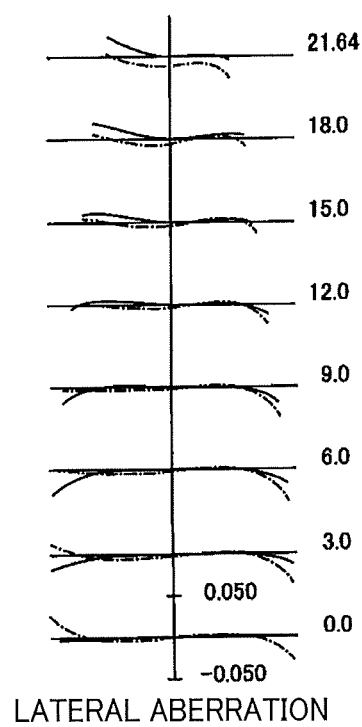
LATERAL ABERRATION

FIG. 22
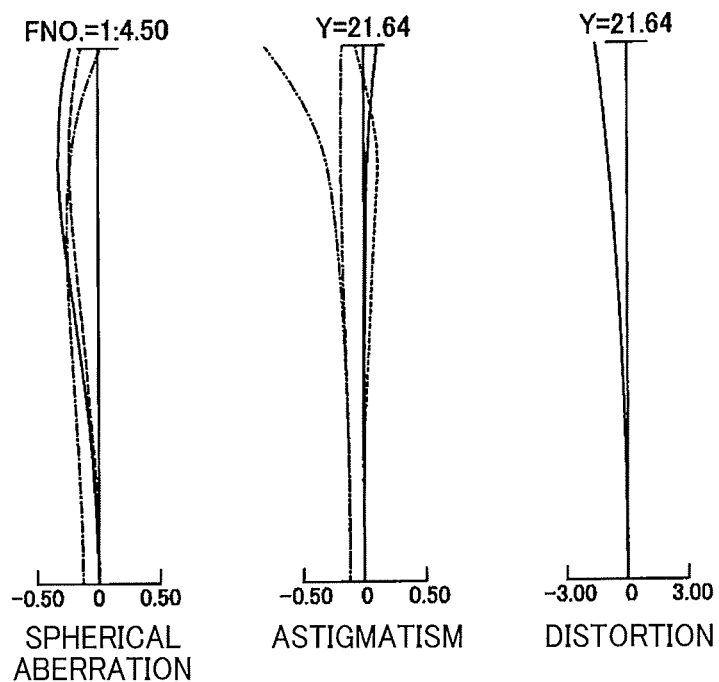
SPHERICAL ABERRATION   ASTIGMATISM   DISTORTION
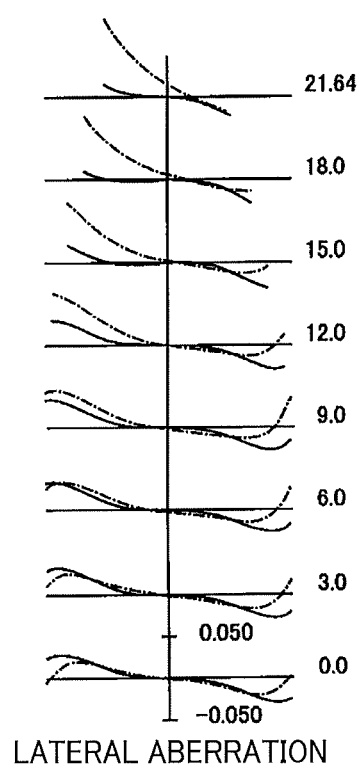
LATERAL ABERRATION

FIG. 23
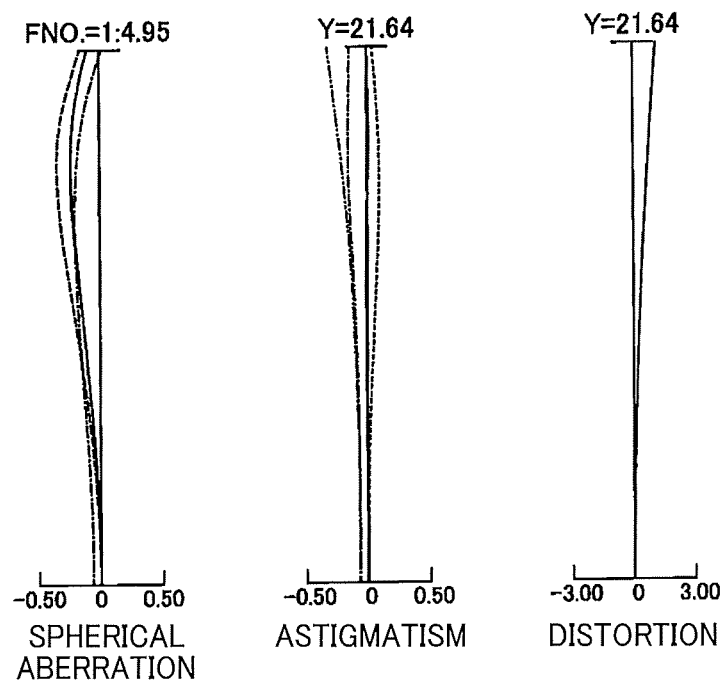
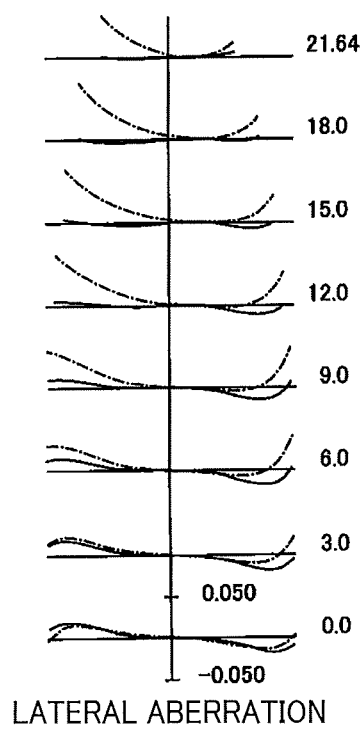
LATERAL ABERRATION

FIG. 24
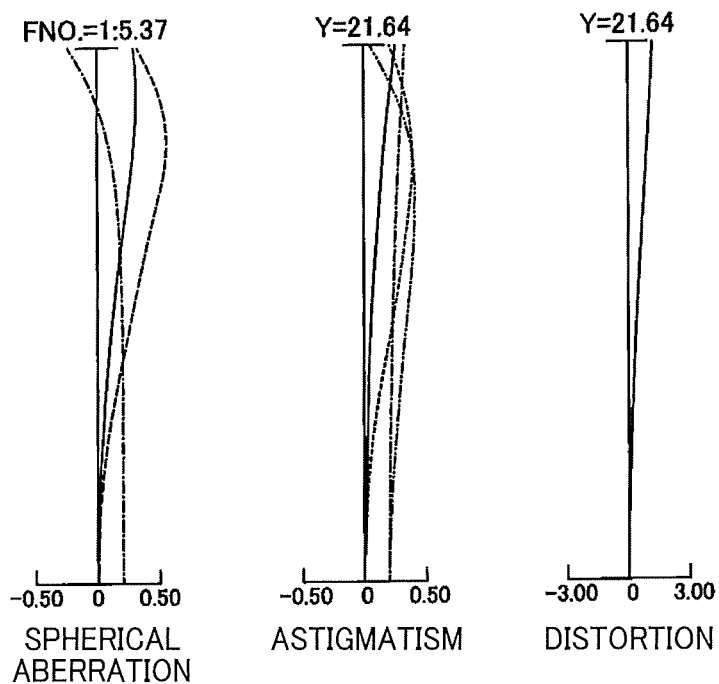
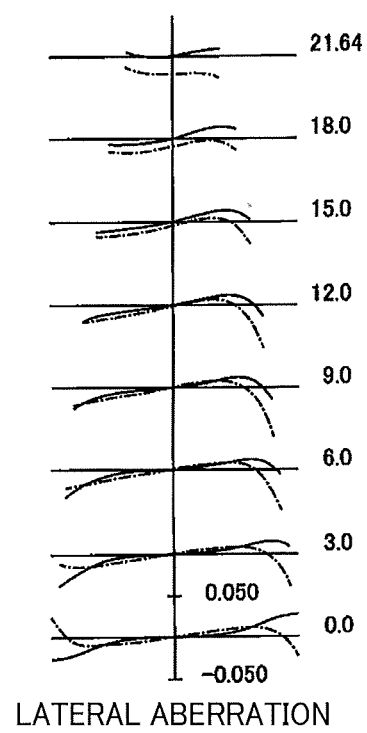
LATERAL ABERRATION

FIG. 26
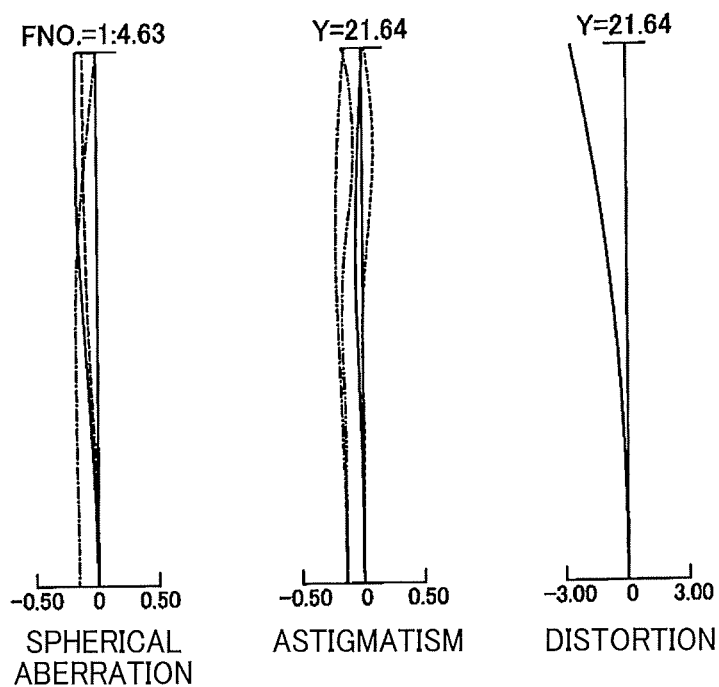
SPHERICAL ABERRATION   ASTIGMATISM   DISTORTION
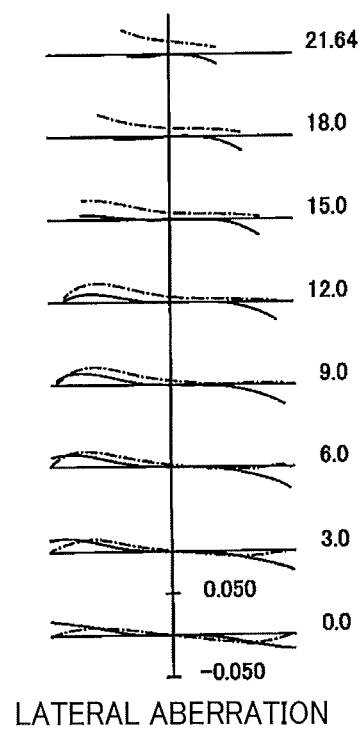
LATERAL ABERRATION

FIG. 27
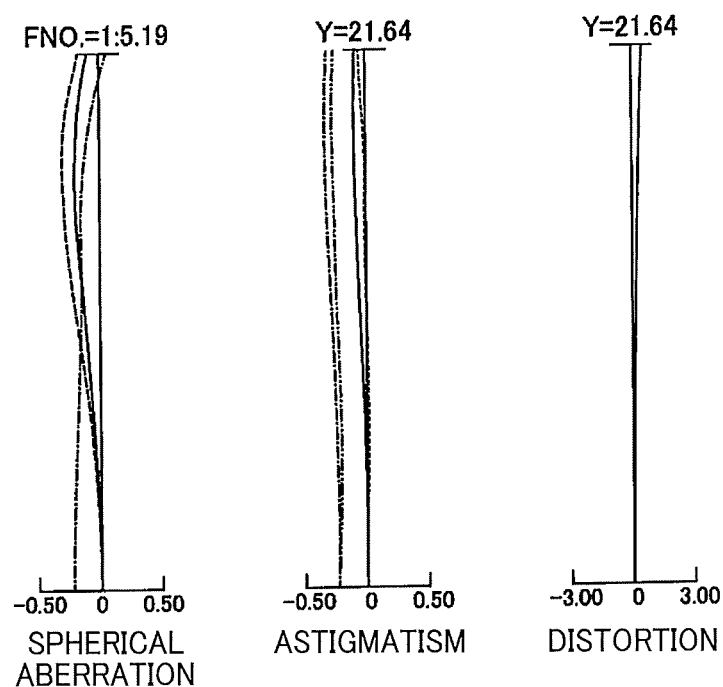
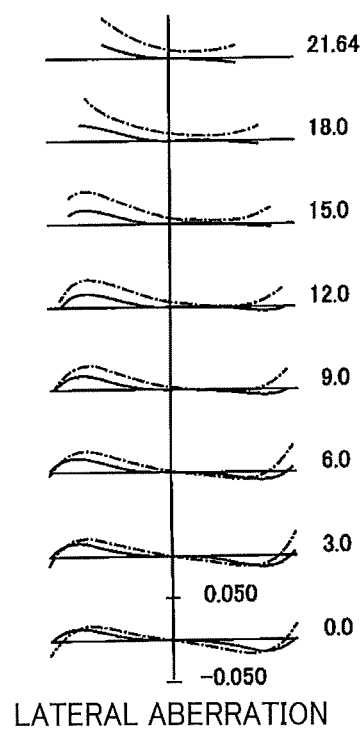
LATERAL ABERRATION

FIG. 28
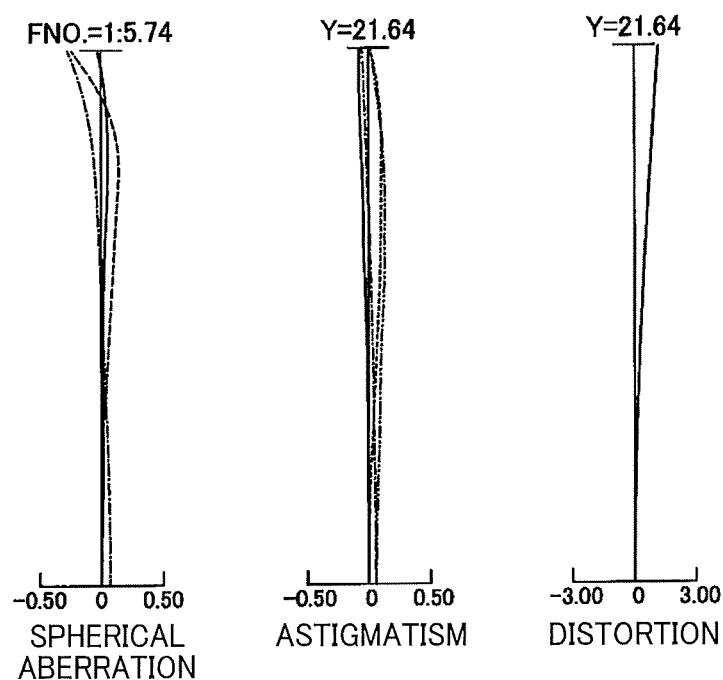
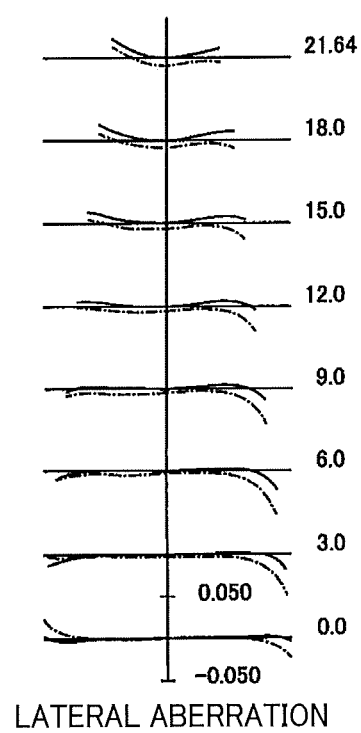
LATERAL ABERRATION

FIG. 31

TABLE 1

| SURFACE NUMBER | R | D | N | ν | φ |
|---|---|---|---|---|---|
| 1 | 97.269 | 7.22 | 1.48749 | 70.24 | 60.1 |
| 2 | 1331.362 | 0.30 | | | 58.9 |
| 3 | 90.890 | 2.20 | 1.83400 | 37.16 | 56.2 |
| 4 | 53.673 | 10.20 | 1.49700 | 81.54 | 53.2 |
| 5 | 399.004 | D5 | | | 51.0 |
| 6 | 478.231 | 1.40 | 1.90525 | 35.04 | 28.4 |
| 7 | 31.191 | 3.00 | | | 26.3 |
| 8 | 33.547 | 3.40 | 1.85896 | 22.73 | 26.0 |
| 9 | 69.000 | 2.00 | | | 25.1 |
| 10 | 65.923 | 4.01 | 1.80809 | 22.76 | 24.0 |
| 11 | -87.071 | 0.67 | | | 23.5 |
| 12 | -202.678 | 1.40 | 1.65160 | 58.55 | 22.6 |
| 13 | 35.749 | 7.55 | | | 21.5 |
| 14 | -31.596 | 1.40 | 2.00100 | 29.13 | 21.2 |
| 15 | -94.744 | D15 | | | 22.0 |
| 16 | STOP | 2.00 | | | 23.4 |
| 17 | 373.630 | 3.65 | 1.80610 | 40.93 | 24.6 |
| 18 | -62.056 | 0.31 | | | 25.2 |
| 19 | 57.362 | 5.58 | 1.59522 | 67.73 | 25.6 |
| 20 | -39.374 | 1.40 | 2.00100 | 29.13 | 25.5 |
| 21 | -198.599 | 25.035 | | | 25.7 |
| 22 | 75.018 | 1.43 | 1.95375 | 32.32 | 26.1 |
| 23 | 34.018 | 5.35 | 1.49700 | 81.54 | 25.7 |
| 24 | -90.698 | 0.31 | | | 25.7 |
| 25 | 66.063 | 3.52 | 1.80610 | 40.93 | 25.5 |
| 26 | -320.919 | D26 | | | 25.0 |
| 27 | 86.351 | 3.87 | 1.67270 | 32.10 | 24.0 |
| 28 | -63.542 | 1.13 | | | 23.5 |
| 29 | -63.044 | 1.40 | 1.75700 | 47.82 | 22.7 |
| 30 | 25.796 | D30 | | | 21.7 |
| 31 | -32.206 | 1.50 | 1.62041 | 60.29 | 26.5 |
| 32 | -159.569 | 0.55 | | | 28.6 |
| 33 | 68.476 | 4.64 | 1.62004 | 36.26 | 31.0 |
| 34 | -129.030 | BF | | | 31.6 |

FIG. 32

TABLE 2

|  | SHORT FOCAL LENGTH END | INTERMEDIATE FOCAL LENGTH | LONG FOCAL LENGTH END |
|---|---|---|---|
| FOCAL LENGTH | 72.2 | 135.0 | 293.1 |
| F-NUMBER | 4.56 | 5.01 | 5.52 |
| D5 | 4.1815 | 37.3291 | 71.7556 |
| D15 | 22.1397 | 11.2491 | 3.0000 |
| D26 | 4.7989 | 7.8466 | 3.0430 |
| D30 | 18.3889 | 15.3412 | 20.1449 |
| BF | 38.3000 | 49.1906 | 57.4397 |

FIG. 33

TABLE 3

| | | |
|---|---|---|
| CONDITIONAL EXPRESSION (1) | $(1-b2a\_s) \cdot bb\_s$ | -0.82 |
| CONDITIONAL EXPRESSION (2) | $f2a/f2b$ | 1.44 |
| CONDITIONAL EXPRESSION (3) | $(R212-R221)/(R212+R221)$ | -0.04 |
| CONDITIONAL EXPRESSION (4) | $Da/D2a$ | 0.38 |
| CONDITIONAL EXPRESSION (5) | $f21/f22$ | -0.51 |
| CONDITIONAL EXPRESSION (6) | $f21\_l \cdot bb\_l$ | -1.69 |
| CONDITIONAL EXPRESSION (7) | $(1-bfoc\_l2) \cdot bfocb\_l2$ | -6.65 |
| CONDITIONAL EXPRESSION (8) | $f1\_l/f\_s$ | 2.15 |
| CONDITIONAL EXPRESSION (9) | $TL\_l/f\_l$ | 0.89 |

FIG. 34

TABLE 4

| SURFACE NUMBER | R | D | N | ν | φ |
|---|---|---|---|---|---|
| 1 | 96.415 | 6.84 | 1.48749 | 70.24 | 59.1 |
| 2 | 1117.934 | 0.30 | | | 58.1 |
| 3 | 93.150 | 2.20 | 1.83400 | 37.16 | 55.5 |
| 4 | 54.169 | 8.93 | 1.49700 | 81.54 | 52.6 |
| 5 | 430.671 | D5 | | | 51.0 |
| 6 | -1395.421 | 1.40 | 1.91082 | 35.25 | 26.4 |
| 7 | 31.781 | 0.80 | | | 25.2 |
| 8 | 32.235 | 3.94 | 1.89286 | 20.36 | 25.4 |
| 9 | 74.497 | 2.57 | | | 24.7 |
| 10 | 75.213 | 4.00 | 1.78472 | 25.68 | 24.0 |
| 11 | -71.918 | 0.30 | | | 23.5 |
| 12 | -316.131 | 1.40 | 1.60300 | 65.44 | 22.7 |
| 13 | 33.862 | 8.09 | | | 21.4 |
| 14 | -27.163 | 1.40 | 2.00100 | 29.13 | 21.0 |
| 15 | -72.152 | D15 | | | 21.9 |
| 16 | STOP | 2.00 | | | 23.4 |
| 17 | 281.338 | 3.45 | 1.78590 | 44.20 | 24.7 |
| 18 | -64.239 | 0.30 | | | 25.2 |
| 19 | 58.710 | 5.42 | 1.59522 | 67.73 | 25.6 |
| 20 | -38.838 | 1.40 | 2.00100 | 29.13 | 25.5 |
| 21 | -163.082 | 24.430 | | | 25.8 |
| 22 | 85.410 | 1.40 | 1.95375 | 32.32 | 26.0 |
| 23 | 34.648 | 5.33 | 1.49700 | 81.54 | 25.6 |
| 24 | -84.197 | 0.30 | | | 25.7 |
| 25 | 59.939 | 3.51 | 1.83400 | 37.16 | 25.5 |
| 26 | -528.103 | D26 | | | 25.0 |
| 27 | 150.135 | 3.73 | 1.64769 | 33.79 | 24.1 |
| 28 | -56.250 | 1.24 | | | 23.7 |
| 29 | -56.763 | 1.40 | 1.71300 | 53.87 | 22.9 |
| 30 | 26.420 | D30 | | | 22.1 |
| 31 | -31.364 | 1.50 | 1.49700 | 81.54 | 27.5 |
| 32 | -95.848 | 0.30 | | | 29.6 |
| 33 | 55.201 | 4.48 | 1.59551 | 39.24 | 32.4 |
| 34 | -1035.864 | BF | | | 32.8 |

FIG. 35

TABLE 5

|  | SHORT FOCAL LENGTH END | INTERMEDIATE FOCAL LENGTH | LONG FOCAL LENGTH END |
|---|---|---|---|
| FOCAL LENGTH | 72.2 | 135.0 | 293.2 |
| F-NUMBER | 4.43 | 4.88 | 5.34 |
| D5 | 7.5765 | 39.8273 | 75.2170 |
| D15 | 22.2854 | 11.0288 | 3.0003 |
| D26 | 4.8120 | 8.1191 | 3.1790 |
| D30 | 18.8235 | 15.5165 | 20.4565 |
| BF | 38.3185 | 49.5751 | 57.6036 |

FIG. 36

TABLE 6

| | | |
|---|---|---|
| CONDITIONAL EXPRESSION (1) | $(1-b2a\_s) \cdot bb\_s$ | $-0.82$ |
| CONDITIONAL EXPRESSION (2) | $f2a/f2b$ | $1.43$ |
| CONDITIONAL EXPRESSION (3) | $(R212-R221)/(R212+R221)$ | $-0.01$ |
| CONDITIONAL EXPRESSION (4) | $Da/D2a$ | $0.13$ |
| CONDITIONAL EXPRESSION (5) | $f21/f22$ | $-0.56$ |
| CONDITIONAL EXPRESSION (6) | $(1-b2a\_l) \cdot bb\_l$ | $-1.67$ |
| CONDITIONAL EXPRESSION (7) | $(1-bfoc\_l2) \cdot bfocb\_l2$ | $-6.58$ |
| CONDITIONAL EXPRESSION (8) | $f1/f\_s$ | $2.19$ |
| CONDITIONAL EXPRESSION (9) | $TL\_l/f\_l$ | $0.89$ |

FIG. 37

TABLE 7

| SURFACE NUMBER | R | D | N | ν | φ |
|---|---|---|---|---|---|
| 1 | 103.513 | 6.74 | 1.48749 | 70.24 | 59.0 |
| 2 | 1480.867 | 0.30 | | | 57.9 |
| 3 | 98.236 | 2.20 | 1.83400 | 37.16 | 55.5 |
| 4 | 57.716 | 9.11 | 1.49700 | 81.54 | 52.8 |
| 5 | 429.911 | D5 | | | 51.0 |
| 6 | -420.277 | 1.30 | 1.89190 | 37.13 | 26.0 |
| 7 | 30.685 | 1.19 | | | 25.0 |
| 8 | 31.143 | 3.69 | 1.89286 | 20.36 | 25.3 |
| 9 | 58.674 | D9 | | | 24.7 |
| 10 | 180.519 | 3.76 | 1.76182 | 26.52 | 24.0 |
| 11 | -57.977 | 3.02 | | | 23.9 |
| 12 | -272.659 | 1.30 | 1.49700 | 81.54 | 22.1 |
| 13 | 55.326 | 5.27 | | | 21.6 |
| 14 | -30.700 | 1.30 | 1.95375 | 32.32 | 21.3 |
| 15 | -88.491 | D15 | | | 22.1 |
| 16 | STOP | 3.00 | | | 23.0 |
| 17 | 195.494 | 3.50 | 1.74400 | 44.79 | 24.8 |
| 18 | -69.873 | 0.30 | | | 25.3 |
| 19 | 67.490 | 5.13 | 1.59282 | 68.62 | 25.7 |
| 20 | -40.990 | 1.30 | 2.00100 | 29.13 | 25.6 |
| 21 | -141.388 | 27.96 | | | 25.9 |
| 22 | 78.812 | 1.30 | 2.00100 | 29.13 | 26.0 |
| 23 | 33.313 | 5.00 | 1.53775 | 74.70 | 25.6 |
| 24 | -118.347 | 0.30 | | | 25.7 |
| 25 | 54.971 | 3.57 | 1.83400 | 37.16 | 25.5 |
| 26 | -931.656 | D26 | | | 25.0 |
| 27 | 179.117 | 3.21 | 1.75520 | 27.51 | 24.2 |
| 28 | -84.038 | 0.35 | | | 23.8 |
| 29 | -102.938 | 1.30 | 1.71300 | 53.87 | 23.4 |
| 30 | 24.195 | D30 | | | 22.3 |
| 31 | -29.732 | 1.50 | 1.49700 | 81.54 | 26.9 |
| 32 | -129.854 | 0.30 | | | 29.1 |
| 33 | 54.674 | 4.91 | 1.54814 | 45.78 | 31.8 |
| 34 | -217.084 | BF | | | 32.3 |

FIG. 38

TABLE 8

|  | SHORT FOCAL LENGTH END | INTERMEDIATE FOCAL LENGTH | LONG FOCAL LENGTH END |
|---|---|---|---|
| FOCAL LENGTH | 72.0 | 135.1 | 293.6 |
| F-NUMBER | 4.59 | 4.96 | 5.52 |
| D5 | 4.6757 | 43.1572 | 80.2599 |
| D9 | 3.0101 | 6.5501 | 5.7363 |
| D15 | 23.1369 | 9.9978 | 2.0000 |
| D26 | 5.0430 | 7.8906 | 2.5143 |
| D30 | 17.6683 | 14.8208 | 20.1971 |
| BF | 38.5837 | 48.1828 | 56.9944 |

FIG. 39

TABLE 9

| | | |
|---|---|---|
| CONDITIONAL EXPRESSION (1) | $(1-b2a\_s) \cdot bb\_s$ | -1.10 |
| CONDITIONAL EXPRESSION (2) | $f2a/f2b$ | 0.62 |
| CONDITIONAL EXPRESSION (3) | $(R212-R221)/(R212+R221)$ | -0.01 |
| CONDITIONAL EXPRESSION (4) | $Da/D2a$ | 0.19 |
| CONDITIONAL EXPRESSION (5) | $f21/f22$ | -0.46 |
| CONDITIONAL EXPRESSION (6) | $(1-b2a\_l) \cdot bb\_l$ | -2.18 |
| CONDITIONAL EXPRESSION (7) | $(1-bfoc\_l^2) \cdot bfocb\_l^2$ | -7.00 |
| CONDITIONAL EXPRESSION (8) | $f1/f\_s$ | 2.31 |
| CONDITIONAL EXPRESSION (9) | $TL\_l/f\_l$ | 0.92 |

FIG. 40

TABLE 10

| SURFACE NUMBER | R | D | N | ν | φ |
|---|---|---|---|---|---|
| 1 | 107.187 | 6.39 | 1.48749 | 70.24 | 58.7 |
| 2 | 1058.972 | 0.30 | | | 57.6 |
| 3 | 103.073 | 2.20 | 1.83400 | 37.16 | 55.5 |
| 4 | 60.629 | 9.29 | 1.49700 | 81.54 | 52.9 |
| 5 | 506.496 | D5 | | | 51.0 |
| 6 | −274.225 | 1.30 | 1.79952 | 42.22 | 27.9 |
| 7 | 35.939 | 1.59 | | | 26.1 |
| 8 | 34.557 | 3.14 | 1.89286 | 20.36 | 25.9 |
| 9 | 51.107 | D9 | | | 24.9 |
| 10 | 107.440 | 3.99 | 1.80518 | 25.42 | 24.0 |
| 11 | −62.774 | 0.30 | | | 23.8 |
| 12 | 4569.817 | 1.30 | 1.49700 | 81.54 | 22.9 |
| 13 | 41.148 | 8.07 | | | 22.1 |
| 14 | −29.281 | 1.30 | 2.00100 | 29.13 | 21.4 |
| 15 | −81.702 | D15 | | | 22.2 |
| 16 | STOP | 2.00 | | | 23.4 |
| 17 | 272.440 | 3.45 | 1.79952 | 42.22 | 24.6 |
| 18 | −68.061 | 0.30 | | | 25.1 |
| 19 | 65.804 | 5.26 | 1.59282 | 68.62 | 25.5 |
| 20 | −40.344 | 1.30 | 2.00100 | 29.13 | 25.3 |
| 21 | −168.789 | 26.15 | | | 25.6 |
| 22 | 82.238 | 1.30 | 2.00100 | 29.13 | 26.0 |
| 23 | 34.732 | 5.14 | 1.53775 | 74.70 | 25.6 |
| 24 | −97.371 | 0.30 | | | 25.7 |
| 25 | 62.252 | 3.49 | 1.83400 | 37.16 | 25.5 |
| 26 | −360.804 | D26 | | | 25.0 |
| 27 | 163.118 | 3.61 | 1.72825 | 28.46 | 24.1 |
| 28 | −58.479 | 0.30 | | | 23.7 |
| 29 | −62.086 | 1.30 | 1.71300 | 53.87 | 23.4 |
| 30 | 24.877 | D30 | | | 22.2 |
| 31 | −32.059 | 1.50 | 1.48749 | 70.24 | 27.6 |
| 32 | −135.572 | 0.30 | | | 29.7 |
| 33 | 51.534 | 4.67 | 1.54814 | 45.78 | 32.4 |
| 34 | −922.329 | BF | | | 32.8 |

FIG. 41

TABLE 11

|  | SHORT FOCAL LENGTH END | INTERMEDIATE FOCAL LENGTH | LONG FOCAL LENGTH END |
|---|---|---|---|
| FOCAL LENGTH | 72.0 | 134.9 | 293.5 |
| F-NUMBER | 4.58 | 4.99 | 5.51 |
| D5 | 4.8516 | 44.4600 | 84.4008 |
| D9 | 2.9540 | 6.4011 | 6.0532 |
| D15 | 24.7267 | 11.2037 | 3.0000 |
| D26 | 4.8064 | 7.5683 | 2.5690 |
| D30 | 19.9809 | 17.2190 | 22.2183 |
| BF | 38.3029 | 48.3788 | 56.9304 |

FIG. 42

TABLE 12

| | | |
|---|---|---|
| CONDITIONAL EXPRESSION (1) | $(1-b2a\_s) \cdot bb\_s$ | -1.05 |
| CONDITIONAL EXPRESSION (2) | $f2a/f2b$ | 0.65 |
| CONDITIONAL EXPRESSION (3) | $(R212-R221)/(R212+R221)$ | 0.02 |
| CONDITIONAL EXPRESSION (4) | $Da/D2a$ | 0.26 |
| CONDITIONAL EXPRESSION (5) | $f21/f22$ | -0.36 |
| CONDITIONAL EXPRESSION (6) | $(1-b2a\_l) \cdot bb\_l$ | -2.07 |
| CONDITIONAL EXPRESSION (7) | $(1-bfoc\_l^2) \cdot bfocb\_l^2$ | -7.27 |
| CONDITIONAL EXPRESSION (8) | $f1/f\_s$ | 2.42 |
| CONDITIONAL EXPRESSION (9) | $TL\_l/f\_l$ | 0.94 |

FIG. 43

TABLE 13

| SURFACE NUMBER | R | D | N | ν | φ |
|---|---|---|---|---|---|
| 1 | 279.405 | 2.20 | 1.83400 | 37.21 | 63.9 |
| 2 | 114.973 | 7.54 | 1.49700 | 81.54 | 62.6 |
| 3 | -858.017 | 0.30 | | | 62.0 |
| 4 | 116.910 | 6.49 | 1.49700 | 81.54 | 61.7 |
| 5 | -2940.180 | D5 | | | 61.2 |
| 6 | FIXED STOP | 1.00 | | | 26.4 |
| 7 | -211.810 | 1.35 | 1.74320 | 49.34 | 26.2 |
| 8 | 33.720 | 1.38 | | | 25.4 |
| 9 | 34.226 | 3.28 | 1.84666 | 23.78 | 25.7 |
| 10 | 60.184 | D10 | | | 25.2 |
| 11 | 161.732 | 3.76 | 2.00100 | 29.13 | 25.0 |
| 12 | -70.599 | 3.33 | | | 24.9 |
| 13 | -358.489 | 1.35 | 1.48749 | 70.24 | 22.9 |
| 14 | 39.382 | 4.55 | | | 21.9 |
| 15 | -29.367 | 1.35 | 2.00100 | 29.13 | 21.8 |
| 16 | -81.240 | D16 | | | 22.6 |
| 17 | 119.111 | 3.94 | 1.76200 | 40.10 | 26.5 |
| 18 | -77.867 | 0.30 | | | 26.6 |
| 19 | 44.847 | 5.63 | 1.61800 | 63.33 | 25.8 |
| 20 | -53.735 | 1.35 | 2.00100 | 29.13 | 25.0 |
| 21 | 891.331 | 0.59 | | | 24.4 |
| 22 | STOP | 14.69 | | | 24.2 |
| 23 | 88.521 | 1.35 | 2.00100 | 29.13 | 23.5 |
| 24 | 28.702 | 5.28 | 1.49700 | 81.54 | 23.0 |
| 25 | -146.284 | 7.58 | | | 23.2 |
| 26 | 59.842 | 3.71 | 1.90366 | 31.34 | 25.2 |
| 27 | -322.914 | D27 | | | 25.0 |
| 28 | -170.523 | 3.10 | 1.84666 | 23.78 | 24.2 |
| 29 | -47.684 | 1.50 | | | 24.1 |
| 30 | -49.176 | 1.35 | 1.72916 | 54.09 | 23.3 |
| 31 | 30.204 | D31 | | | 22.9 |
| 32 | 41.002 | 8.50 | 1.64769 | 33.79 | 32.6 |
| 33 | -39.801 | 0.31 | | | 32.5 |
| 34 | -41.441 | 1.35 | 2.00100 | 29.13 | 32.1 |
| 35 | 263.203 | BF | | | 32.5 |

FIG. 44

TABLE 14

|  | SHORT FOCAL LENGTH END | INTERMEDIATE FOCAL LENGTH | LONG FOCAL LENGTH END |
|---|---|---|---|
| FOCAL LENGTH | 72.2 | 135.2 | 293.0 |
| F-NUMBER | 4.62 | 5.15 | 5.74 |
| D5 | 1.8771 | 52.6373 | 98.7310 |
| D10 | 3.3372 | 6.3991 | 3.7597 |
| D16 | 26.6957 | 14.5349 | 5.0000 |
| D27 | 5.4647 | 8.7219 | 5.9581 |
| D31 | 18.4858 | 15.2286 | 17.9924 |
| BF | 39.03660 | 48.13546 | 60.30981 |

FIG. 45

TABLE 15

| | | |
|---|---|---|
| CONDITIONAL EXPRESSION (1) | $(1-b2a\_s) \cdot bb\_s$ | $-1.00$ |
| CONDITIONAL EXPRESSION (2) | $f2a/f2b$ | $0.75$ |
| CONDITIONAL EXPRESSION (3) | $(R212-R221)/(R212+R221)$ | $-0.01$ |
| CONDITIONAL EXPRESSION (4) | $Da/D2a$ | $0.23$ |
| CONDITIONAL EXPRESSION (5) | $f21/f22$ | $-0.44$ |
| CONDITIONAL EXPRESSION (6) | $(1-b2a\_l) \cdot bb\_l$ | $-1.98$ |
| CONDITIONAL EXPRESSION (7) | $(1-bfoc\_l^2) \cdot bfocb\_l^2$ | $-6.71$ |
| CONDITIONAL EXPRESSION (8) | $f1/f\_s$ | $2.75$ |
| CONDITIONAL EXPRESSION (9) | $TL\_l/f\_l$ | $0.99$ |

FIG. 46

TABLE 16

| SURFACE NUMBER | R | D | N | ν | φ |
|---|---|---|---|---|---|
| 1 | 99.734 | 6.16 | 1.48749 | 70.24 | 58.7 |
| 2 | 693.339 | 0.30 | | | 57.7 |
| 3 | 100.414 | 2.20 | 1.83400 | 37.16 | 55.6 |
| 4 | 58.430 | 9.55 | 1.49700 | 81.54 | 52.9 |
| 5 | 495.043 | D5 | | | 51.0 |
| 6 | -422.223 | 1.30 | 1.80610 | 40.93 | 27.9 |
| 7 | 29.056 | 1.23 | | | 25.9 |
| 8 | 29.679 | 3.60 | 1.89286 | 20.36 | 25.9 |
| 9 | 51.338 | 2.86 | | | 24.9 |
| 10 | 102.085 | 3.95 | 1.74077 | 27.79 | 24.0 |
| 11 | -60.234 | 1.80 | | | 23.8 |
| 12 | -268.845 | 1.30 | 1.49700 | 81.54 | 22.2 |
| 13 | 42.635 | 7.40 | | | 21.4 |
| 14 | -28.366 | 1.30 | 2.00100 | 29.13 | 21.0 |
| 15 | -77.576 | D15 | | | 21.8 |
| 16 | STOP | 2.00 | | | 23.2 |
| 17 | 300.949 | 3.46 | 1.75700 | 47.82 | 24.5 |
| 18 | -63.125 | 0.30 | | | 25.1 |
| 19 | 59.211 | 5.37 | 1.59282 | 68.62 | 25.6 |
| 20 | -39.675 | 1.30 | 2.00100 | 29.13 | 25.5 |
| 21 | -134.975 | D21 | | | 25.8 |
| 22 | 93.518 | 1.30 | 2.00100 | 29.13 | 25.9 |
| 23 | 33.979 | 5.12 | 1.53775 | 74.70 | 25.5 |
| 24 | -92.719 | 0.30 | | | 25.6 |
| 25 | 56.492 | 3.51 | 1.85026 | 32.27 | 25.5 |
| 26 | -738.376 | D26 | | | 25.0 |
| 27 | 139.523 | 3.64 | 1.72151 | 29.23 | 24.2 |
| 28 | -59.187 | 0.40 | | | 23.8 |
| 29 | -61.665 | 1.30 | 1.71300 | 53.87 | 23.4 |
| 30 | 24.591 | D30 | | | 22.3 |
| 31 | -31.935 | 1.50 | 1.49700 | 81.54 | 27.1 |
| 32 | -154.221 | 0.30 | | | 29.3 |
| 33 | 51.419 | 5.10 | 1.51742 | 52.43 | 32.0 |
| 34 | -203.219 | BF | | | 32.5 |

FIG. 47

TABLE 17

|  | SHORT FOCAL LENGTH END | INTERMEDIATE FOCAL LENGTH | LONG FOCAL LENGTH END |
|---|---|---|---|
| FOCAL LENGTH | 72.1 | 135.0 | 293.4 |
| F-NUMBER | 4.50 | 4.95 | 5.37 |
| D5 | 4.6703 | 42.4584 | 83.8594 |
| D15 | 20.7138 | 9.8614 | 3.0000 |
| D21 | 25.5337 | 25.1026 | 25.4097 |
| D26 | 5.2021 | 8.1725 | 2.5058 |
| D30 | 17.5429 | 14.5725 | 20.2392 |
| BF | 39.00230 | 50.28580 | 56.84010 |

FIG. 48

TABLE 18

| | | |
|---|---|---|
| CONDITIONAL EXPRESSION (1) | $(1-b2a\_s) \cdot bb\_s$ | −1.05 |
| CONDITIONAL EXPRESSION (2) | $f2a/f2b$ | 0.78 |
| CONDITIONAL EXPRESSION (3) | $(R212-R221)/(R212+R221)$ | −0.01 |
| CONDITIONAL EXPRESSION (4) | $Da/D2a$ | 0.20 |
| CONDITIONAL EXPRESSION (5) | $f21/f22$ | −0.46 |
| CONDITIONAL EXPRESSION (6) | $(1-b2a\_l) \cdot bb\_l$ | −2.03 |
| CONDITIONAL EXPRESSION (7) | $(1-bfoc\_l^2) \cdot bfocb\_l^2$ | −6.68 |
| CONDITIONAL EXPRESSION (8) | $f1/f\_s$ | 2.37 |
| CONDITIONAL EXPRESSION (9) | $TL\_l/f\_l$ | 0.92 |

FIG. 49

TABLE 19

| SURFACE NUMBER | R | D | N | ν | φ |
|---|---|---|---|---|---|
| 1 | 99.253 | 5.40 | 1.48749 | 70.24 | 53.0 |
| 2 | 1397.368 | 0.20 | | | 52.6 |
| 3 | 100.745 | 1.95 | 1.83400 | 37.20 | 51.7 |
| 4 | 56.982 | 7.70 | 1.49700 | 81.55 | 50.0 |
| 5 | 585.095 | D5 | | | 49.3 |
| 6 | -141.620 | 0.96 | 1.65160 | 58.55 | 24.6 |
| 7 | 32.543 | 1.40 | | | 24.1 |
| 8 | 32.259 | 2.15 | 1.84666 | 23.78 | 24.6 |
| 9 | 50.420 | 3.24 | | | 24.4 |
| 10 | 1510.480 | 2.70 | 1.91082 | 35.25 | 24.4 |
| 11 | -54.493 | 0.20 | | | 24.4 |
| 12 | 417.468 | 1.20 | 1.83400 | 37.20 | 23.7 |
| 13 | 22.174 | 4.09 | 1.76182 | 26.52 | 22.7 |
| 14 | 70.614 | 3.49 | | | 22.2 |
| 15 | -28.047 | 1.20 | 1.83400 | 37.20 | 22.2 |
| 16 | -122.178 | D16 | | | 23.1 |
| 17 | STOP | 1.80 | | | 24.2 |
| 18 | 238.169 | 3.00 | 1.80400 | 46.53 | 25.4 |
| 19 | -63.599 | 0.20 | | | 25.7 |
| 20 | 41.342 | 6.20 | 1.49700 | 81.55 | 26.1 |
| 21 | -41.342 | 1.20 | 2.00100 | 29.13 | 25.9 |
| 22 | -303.653 | 18.38 | | | 26.0 |
| 23 | 84.166 | 1.20 | 2.00100 | 29.13 | 26.8 |
| 24 | 35.196 | 5.70 | 1.48749 | 70.24 | 26.5 |
| 25 | -75.219 | 0.20 | | | 26.6 |
| 26 | 65.603 | 3.20 | 1.91082 | 35.25 | 27.0 |
| 27 | -332.779 | D27 | | | 26.8 |
| 28 | -875.660 | 2.13 | 1.84666 | 23.78 | 21.0 |
| 29 | -54.081 | 1.98 | | | 21.0 |
| 30 | -51.289 | 0.80 | 1.77250 | 49.60 | 20.0 |
| 31 | 32.834 | D31 | | | 19.7 |
| 32 | -27.290 | 1.30 | 1.48749 | 70.24 | 25.7 |
| 33 | -45.252 | 0.20 | | | 27.1 |
| 34 | 56.317 | 5.90 | 1.57501 | 41.50 | 29.4 |
| 35 | -58.451 | 1.20 | 1.90366 | 31.31 | 29.7 |
| 36 | -368.732 | | | | 30.3 |

FIG. 50

TABLE 20

|  | SHORT FOCAL LENGTH END | INTERMEDIATE FOCAL LENGTH | LONG FOCAL LENGTH END |
|---|---|---|---|
| FOCAL LENGTH | 72.1 | 135.2 | 291.0 |
| F-NUMBER | 4.63 | 5.19 | 5.74 |
| D5 | 4.7272 | 38.2016 | 73.7761 |
| D16 | 26.0283 | 13.4760 | 2.0693 |
| D27 | 3.7981 | 6.9283 | 6.0394 |
| D31 | 22.5292 | 19.3990 | 20.2879 |
| BF | 42.6020 | 55.1501 | 66.5597 |

FIG. 51

TABLE 21

| | | |
|---|---|---|
| CONDITIONAL EXPRESSION (1) | $(1-b2a\_s) \cdot bb\_s$ | $-0.96$ |
| CONDITIONAL EXPRESSION (2) | $f2a/f2b$ | $1.03$ |
| CONDITIONAL EXPRESSION (3) | $(R212-R221)/(R212+R221)$ | $0.00$ |
| CONDITIONAL EXPRESSION (4) | $Da/D2a$ | $0.31$ |
| CONDITIONAL EXPRESSION (5) | $f21/f22$ | $-0.40$ |
| CONDITIONAL EXPRESSION (6) | $(1-b2a\_l) \cdot bb\_l$ | $-2.03$ |
| CONDITIONAL EXPRESSION (7) | $(1-bfoc\_l2) \cdot bfocb\_l2$ | $-8.30$ |
| CONDITIONAL EXPRESSION (8) | $f1/f\_s$ | $2.25$ |
| CONDITIONAL EXPRESSION (9) | $TL\_l/f\_l$ | $0.89$ |

ZOOM LENS SYSTEM AND IMAGING APPARATUS PROVIDED WITH THE SAME

CROSS-REFERENCE TO RELATED APPLICATION

This patent application is based on and claims priority pursuant to 35 U.S.C. § 119(a) to Japanese Patent Application No. 2018-224783, filed on Nov. 30, 2018, in the Japan Patent Office, the entire disclosure of which is hereby incorporated by reference herein.

BACKGROUND

Technical Field

Embodiments of the present disclosure relate to a zoom lens system and an imaging apparatus provided with the zoom lens system.

Background Art

In recent years, for example, the user's demand for a telephoto zoom lens system for a single-lens reflex camera has been diversified. Particularly, high performance is highly demanded. In order to have a high performance, it is expected to have resolution corresponding to an image sensor of at least 30 million pixels or more, cause few coma flares, have high contrast, and form a dot image with less distortion in an area up to the periphery of angle of view in opening an aperture. Further, an area where there are few chromatic aberration and a great difference in luminance is not unnecessarily colored, and a straight line can be drawn as a straight line due to less distortion aberration.

Further, in the case of shooting with a hand-held camera, when the exposure time is long, camera shake might cause blurring of the captured image. In view of such circumstances, a mechanism for correcting image blur is desired. When a camera shake at the same angle occurs, the degree of image blur increases as the focal length increases, so it is desirable to correct image blur at the long focal-length end side (tele end side).

As an example of zoom lens systems meeting such demands, a zoom lens is known that includes a first lens group having positive refractive power and a second lens group having negative refractive power in that order from the object side. In such a zoom lens, all or a part of the second lens group is moved so as to obtain the component in a direction vertical to the optical axis (driven to correct an image blur). This configuration is advantageous in correcting image blur of a telephoto zoom lens system because the amount of correction for image blur is large with respect to the movement on the long focal length end side (tele end side).

SUMMARY

In one aspect of this disclosure, there is provided an improved zoom lens system including: a first lens group having positive refractive power; a second lens group having negative refractive power; and a rear group, the first lens group, the second lens group and the rear group being arranged in that order from an object side. The second lens group includes a second lens group-a having negative refractive power and a second lens group-b having negative refractive power arranged in that order from the object side. The second lens group-a includes a negative lens and a positive lens arranged in that order from the object side. The second lens group-a is configured to move to include a component in a direction vertical to an optical axis of the zoom lens system. The rear lens group includes an aperture stop, and at least two lens groups. During a change in a focus from a short focal length end to a long focal length end to change a magnification power, a distance between the first lens group and the second lens group-a increases, a distance between the second lens group-a and the second lens group-b is changeable or stationary, and a distance between the second lens group-b and the rear lens group decreases.

In another aspect of this disclosure, there is provided an improved imaging apparatus incorporating the above-described zoom lens system.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a collection of aberration diagrams of the zoom lens system according to the first numerical example focused at a short focal length end;

FIG. 3 is a collection of aberration diagrams of the zoom lens system according to the first numerical example focused at an intermediate focal length;

FIG. 4 is a collection of aberration diagrams of the zoom lens system according to the first numerical example focused at a long focal length end;

FIG. 6 is a collection of aberration diagrams of the zoom lens system according to the second numerical example focused at the short focal length end;

FIG. 7 is a collection of aberration diagrams of the zoom lens system according to the second numerical example focused at the intermediate focal length;

FIG. 8 is a collection of aberration diagrams of the zoom lens system according to the second numerical example focused at the long focal length end;

FIG. 10 is a collection of aberration diagrams of the zoom lens system according to the third numerical example focused at the short focal length end;

FIG. 11 is a collection of aberration diagrams of the zoom lens system according to the third numerical example focused at the intermediate focal length;

FIG. 12 is a collection of aberration diagrams of the zoom lens system according to the third numerical example focused at the long focal length end;

FIG. 14 is a collection of aberration diagrams of the zoom lens system according to the fourth numerical example focused at the short focal length end;

FIG. 15 is a collection of aberration diagrams of the zoom lens system according to the fourth numerical example focused at the intermediate focal length;

FIG. 16 is a collection of aberration diagrams of the zoom lens system according to the fourth numerical example focused at the long focal length end;

FIG. 18 is a collection of aberration diagrams of the zoom lens system according to the fifth numerical example focused at the short focal length end;

FIG. 19 is a collection of aberration diagrams of the zoom lens system according to the fifth numerical example focused at the intermediate focal length;

FIG. 20 is a collection of aberration diagrams of the zoom lens system according to the fifth numerical example focused at the long focal length end;

FIG. 22 is a collection of aberration diagrams of the zoom lens system according to the sixth numerical example focused at the short focal length end;

FIG. 23 is a collection of aberration diagrams of the zoom lens system according to the sixth numerical example focused at the intermediate focal length;

FIG. 24 is a collection of aberration diagrams of the zoom lens system according to the sixth numerical example focused at the long focal length end;

FIG. 26 is a collection of aberration diagrams of the zoom lens system according to the seventh numerical example focused at the short focal length end;

FIG. 27 is a collection of aberration diagrams of the zoom lens system according to the seventh numerical example focused at the intermediate focal length;

FIG. 28 is a collection of aberration diagrams of the zoom lens system according to the seventh numerical example focused at the long focal length end;

FIGS. 31 to 51 are Tables 1 to 21.

Figure 1:
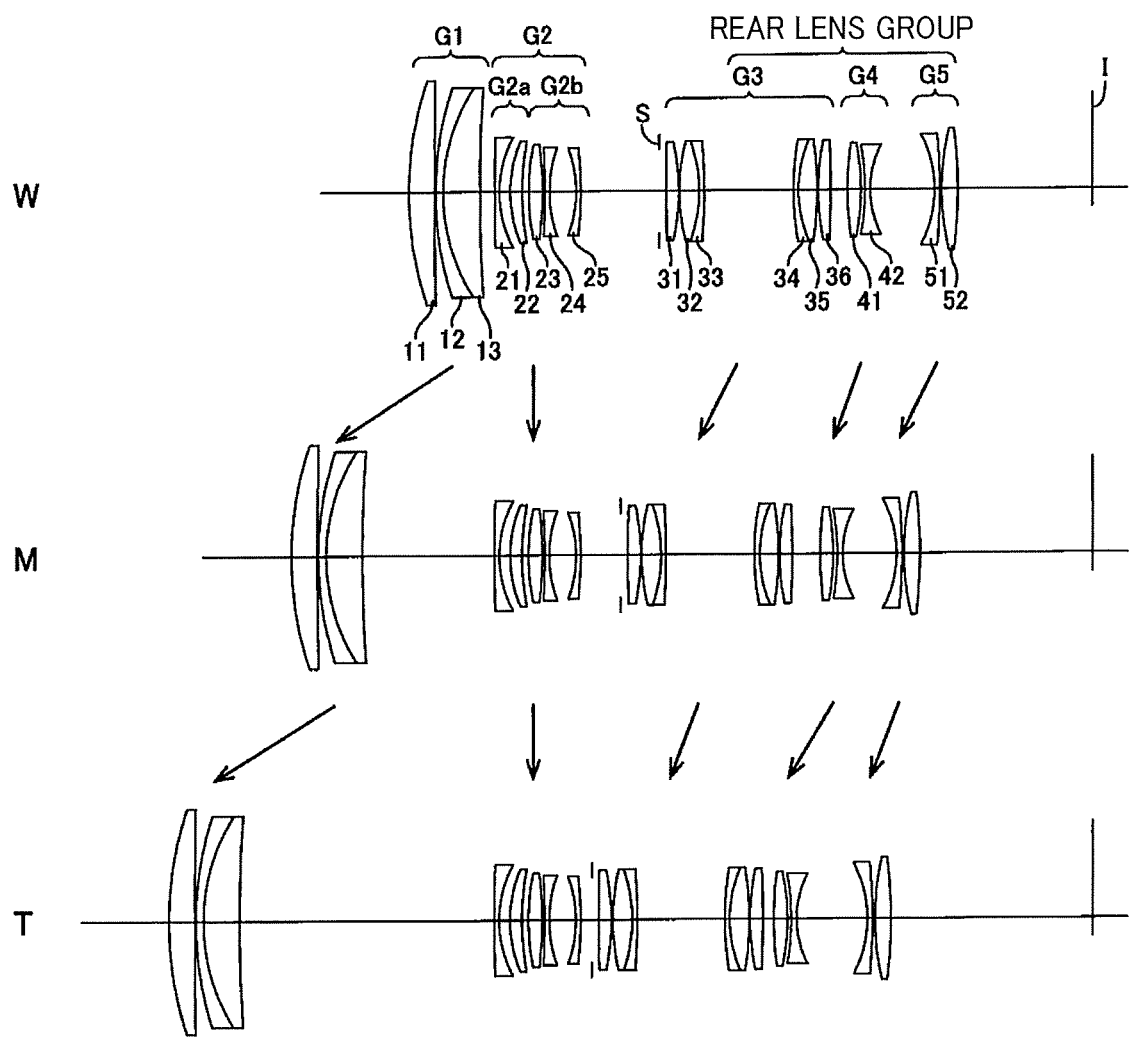
FIG. 1 is an illustration of the configuration of a zoom lens system according to a first numerical example.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The zoom lens system according to the first to seventh numerical examples of an embodiment of the present disclosure includes a first lens group G1 having positive refractive power, a second lens group G2 having negative refractive power, and a rear lens group, which are arranged in that order from the object side. The second lens group G2 includes a second lens group-a G2a having negative refractive power and a second lens group-b G2b having negative refractive power, which are arranged in that order from the object side.

The rear lens group includes an aperture stop S and at least two lens groups.

In the first and fourth numerical examples, the rear lens group includes, in order from the object side, a third lens group G3 having positive refractive power, a fourth lens group G4 having negative refractive power, and a fifth lens G5 having negative refractive power.

By contrast, in the second, third, fifth, and seventh numerical examples, the rear lens group includes, in order from the object side, a third lens group G3 having positive refractive power, a fourth lens group G4 having negative refractive power, and a fifth lens G5 having positive refractive power.

In the sixth numerical example, the rear lens group includes, in order from the object side, a third lens group G3 having positive refractive power, a fourth lens group G4 having positive refractive power, a fifth lens G5 having negative refractive power, and a sixth lens group G6 having positive refractive power.

In the first to fifth, and seventh numerical examples, each of the first lens group G1 to the fifth lens group G5 changes a distance between adjacent lens groups with a change in the focus from the short focal length end to the long focal length end to change the magnification power. In the sixth numerical example, each of the first lens group G1 to the sixth lens group G6 changes a distance between adjacent lens groups with a change in the focus from the short focal length end to the long focal length end to change the magnification power.

In the first, second, sixth, and seventh numerical examples, the distance between the second lens group-a G2a and the second lens group-b G2b is stationary (unchanging) during a change in the focus from the short focal length end to the long focal length end to change the magnification power. In the third to fifth numerical examples, the distance between the second lens group-a G2a and the second lens group-b G2b changes with a change in the focus from the short focal length end to the long focal length end to change the magnification power.

Thus, the zoom lenses according to the first to seventh numerical examples are configured on a lens-group basis as described below, each lens groups being configured to change the distance between adjacent lens groups with a change in the focus from the short focal length end to the long focal length end.

The first numerical example: a configuration of a five-group zoom lens having positive, negative, positive, negative, and negative power arranged in that order from the object side.

The second numerical example: a configuration of a five-group zoom lens having positive, negative, positive, negative, and positive power arranged in that order from the object side.

The third numerical example: a configuration of a six-group zoom lens having positive, negative, negative, positive, negative, and positive power arranged in that order from the object side.

The fourth numerical example: a configuration of a six-group zoom lens having positive, negative, negative, positive, negative, and negative power arranged in that order from the object side.

The fifth numerical example: a configuration of a six-group zoom lens having positive, negative, negative, positive, negative, and positive power arranged in that order from the object side.

The sixth numerical example: a configuration of a six-group zoom lens having positive, negative, positive, positive, negative, and positive power arranged in that order from the object side.

The seventh numerical example: a configuration of a five-group zoom lens having positive, negative, positive, negative, and positive power arranged in that order from the object side.

In the zoom lens system according to the present embodiment, during a change in the focus from the short focal length end to the long focal length end to change the magnification power, the distance between the first lens group G1 and the second lens group-a G2a increases, and the distance between the second lens group-a G2a and the second lens group-b G2b is changeable or stationary. Further, the distance between the second lens group-b G2b and the rear lens group (the third lens group G3) decreases.

In the zoom lens system according to the present embodiment, the second lens group G2 mainly serves to change the magnification power of the zoom lens system, and is classified into the second lens group-a G2a on the object side and the second lens group-b G2b on the image side. The second lens group-a G2a and the second lens group-b G2b share the negative refractive power.

The second lens group-a G2a includes two lenses, i.e., a negative lens and a positive lens (21 and 22 or 21' and 22', respectively), and serves as an image-blur correcting lens group (an antivibration lens group) that moves to obtain a component in a direction vertical to the optical axis. By employing as the image-blur correcting lens group the second lens group-a G2a away from the aperture stop S, various aberrations, particularly eccentric aberration (eccentric coma aberration) are successfully corrected when the second lens group-a G2a includes two lenses.

Further, since the second lens group-a G2a includes two lenses while the zoom lens system is a telephoto lens having a half angle of view of approximately 4 degrees at the long focal length end. This configuration achieves a reduction in the size and the weight of the image-blur correcting lens group (antivibration lens group). In addition, a telephoto zoom lens of a resolution corresponding to an image sensor of, for example, 30 million pixels or more can be provided.

The zoom lens system according to the present embodiment satisfies conditional expression (1) below:

$$-1.5<(1-b2a\_s)bb\_s<-0.7 \quad (1)$$

where $b2a\_s$ denotes magnification power of the second lens group-a when the zoom lens system is focused at the short focal length end; and $bb\_s$ denotes composite lateral magnification power of all lens groups on the image side relative to the second lens group-a when the zoom lens system is focused at the short focal length end.

The zoom lens system according to the embodiment preferably satisfies conditional expression (1') below within the range of the conditional expression (1):

$$-1.2<(1-b2a\_s)bb\_s<-0.8 \quad (1')$$

The zoom lens system according to an embodiment satisfies conditional expression (2) below:

$$0.3<f2a/f2b<2.5 \quad (2)$$

where f2a denotes focal length of the second lens group-a; and
f2b denotes focal length of the second lens group-b.

The zoom lens system according to the embodiment preferably satisfies conditional expression (2') below within the range of the conditional expression (2):

$$0.5<f2a/f2b<2.0 \quad (2')$$

The negative lens of the second lens group-a has a concave surface facing the image side, and the positive lens of the second-a group has a convex surface facing the object side.

The zoom lens system according to an embodiment satisfies conditional expression (3) below:

$$-0.2<(R212-R221)/(R212+R221)<0.2 \quad (3)$$

where

R212 denotes radius of curvature of the image-side surface of the negative lens of the second lens group-a; and
R221 denotes radius of curvature of the object-side surface of the positive lens of the second lens group-a.

The zoom lens system according to the embodiment preferably satisfies conditional expression (3') below within the range of the conditional expression (3):

$$-0.1<(R212-R221)/(R212+R221)<0.1 \quad (3')$$

The zoom lens system according to an embodiment satisfies conditional expression (4) below:

$$0.01<Da/D2a<0.5 \quad (4)$$

where

Da denotes the distance between the negative lens and the positive lens of the second lens group-a along the optical axis; and D2a denotes the thickness of the second lens group-a along the optical axis.

The zoom lens system according to the embodiment preferably satisfies conditional expression (4') below within the range of the conditional expression (4):

$$0.1<Da/D2a<0.4 \quad (4')$$

The zoom lens system according to an embodiment satisfies conditional expression (5) below:

$$-0.7<f21/f22<-0.2 \quad (5)$$

where f21 denotes focal length of the negative lens of the second lens group-a; and
f22 denotes focal length of the positive lens of the second lens group-a.

The zoom lens system according to the embodiment preferably satisfies conditional expression (5') below within the range of the conditional expression (5):

$$-0.6<f21/f22<-0.3 \quad (5')$$

During the zooming (the change in the focus) of the zoom lens system from the short focal length end to the long focal length end to change the magnification power, the second lens group-a is stationary with respect to the image plane.

The rear lens group according to an embodiment includes, in order from the object side, a lens group having positive refractive power and lens groups having negative refractive power. The lens groups having the negative refractive power constitute a focusing lens group that is movable during the focusing of the zoom lens system.

The rear lens group according to an embodiment includes, in order from the object side, a third lens group having positive refractive power, a fourth lens group having negative refractive power, and a fifth lens having negative refractive power.

The rear lens group according to an embodiment includes, in order from the object side, a third lens group having positive refractive power, a fourth lens group having negative refractive power, and a fifth lens group having positive refractive power.

The rear lens group according to an embodiment includes, in order from the object side, a third lens group having positive refractive power, a fourth lens having positive refractive power, a fifth lens group having negative refractive power, and a sixth lens group having positive refractive power.

The zoom lens system according to an embodiment satisfies conditional expression (6) below:

$$-3.0 < (1-b2a\_l)bb\_l < -1.5 \quad (6)$$

where
b2a_l denotes magnification of the second lens group-a when the zoom lens system is focused at the long focal length end; and
bb_l denotes composite lateral magnification power of the lens groups on the image side relative to the second lens group-a when the zoom lens system is focused at the long focal length end.

The zoom lens system according to the embodiment preferably satisfies conditional expression (6') below within the range of the conditional expression (6):

$$-2.5 < (1-b2a\_l)bb\_l < -1.5 \quad (6')$$

The zoom lens system according to an embodiment includes at least one lens group as a focusing group that moves during the focusing. The zoom lens system according to an embodiment satisfies conditional expression (7) below:

$$-10.0 < (1-bfoc\_l^2)bfocb\_l^2 < -4.0 \quad (7)$$

where
bfoc_l denotes magnification power of the focusing lens group when the zoom lens system is focused at the long focal length end; and
bfocb_l denotes composite lateral magnification power of the lens groups on the image side relative to the focusing lens group when the zoom lens system is focused at the long focal length end (the value of bfocb_l is 1 when no lens group exists on the image side relative to the focusing lens group).

The zoom lens system according to an embodiment satisfies conditional expression (8) below:

$$1.5 < f1/f\_s < 3.0 \quad (8)$$

where
f1 denotes the focal length of the first lens group; and
f_s denotes the focal length of the entirety of the zoom lens system when the zoom lens system is focused at the short focal length end.

The zoom lens system according to an embodiment satisfies conditional expression (9) below:

$$0.7 < TL\_l/f\_l < 1.1 \quad (9)$$

where
TL_l denotes the distance between the lens surface closest to the object (the object side) to the image plane when the zoom lens system is focused at the long focal length end; and
f_l denotes the focal length of the entirety of the zoom lens system when the zoom lens system is focused at the long focal length end.

The imaging apparatus according to an embodiment includes the zoom lens system according to any one of the above-described embodiments.

Conditional expressions (1) and (1') define the relation between the magnification of the second lens group-a G2a and the magnification of the lens group on the image side relative to the second lens group-a G2a when the zoom lens system is focused at the short focal length end. By satisfying the conditional expression (1), a suitable amount of correction for the image blur (a suitable sensitivity of antivibration) by the second lens group-a G2a can be set, and the size and weight of the image-blur correcting lens group (antivibration lens group) can be reduced. In addition, the size of the zoom lens system can also be reduced, and various aberrations such as eccentric aberration and eccentric coma aberration can be successfully corrected. Such advantageous effects can be exhibited more significantly by satisfying the conditional expression (1').

If the value of (1−b2a_s)bb_s exceeds the upper limit defined by the conditional expression (1), the sensitivity of antivibration of the second lens group-a G2a becomes too low, which increases the amount of correction for image blur to be done by the second lens group-a G2a. As a result, the size and weight of the image-blur correcting lens group (antivibration lens group) might increase, thus leading to the upsizing of the zoom lens system. In addition, the second lens group-a G2a might intercept peripheral light during the correction of image blur, which adversely reduces the ratio of amount of peripheral light at the short focal length end.

If the value of (1−b2a_s)bb_s falls below the lower limit defined by the conditional expression (1), the sensitivity of antivibration of the second lens group-a G2a becomes too high. Accordingly, the second lens group-a G2a, which includes two lenses (negative lens 21/21' and the positive lens 22/22'), might fail to correct the various aberrations (eccentric aberration and eccentric coma aberration).

Conditional expressions (2) and (2') define the ratio in the focal length between the second lens group-a G2a and the second lens group-b G2b. By satisfying the conditional expression (2), a suitable amount of correction for the image blur (a suitable sensitivity of antivibration) by the second lens group-a G2a can be set, and the size of the zoom lens system can also be reduced. Further, various aberrations such as eccentric aberration and eccentric coma aberration can be successfully corrected. Such advantageous effects can be exhibited more significantly by satisfying the conditional expression (2').

If the value of f2a/f2b exceeds the upper limit defined by the conditional expression (2), the sensitivity of antivibration of the second-a group G2a becomes too low, which increases the amount of correction for image blur to be done by the second lens group-a G2a. Thus, the zoom lens system might be upsized. In addition, the second lens group-a G2a might intercept peripheral light during the correction of image blur, which adversely reduces the ratio of amount of peripheral light at the short focal length end.

If the value of f2a/f2b falls below the lower limit defined by the conditional expression (2), the sensitivity of antivibration of the second lens group-a G2a becomes too high. Accordingly, the second lens group-a G2a, which includes two lenses (negative lens 21/21' and the positive lens 22/22'), might fail to correct the various aberrations (eccentric aberration and eccentric coma aberration).

In the zoom lens system according to an embodiment, the negative lens (21 or 21') of the second lens group-a G2a has a concave surface facing the image side, and the positive lens (22 or 22') of the second lens group-a G2a has a convex surface facing the object side. With this configuration, various aberrations can be corrected more successfully.

Conditional expressions (3) and (3') define the shape (shaping factor) of the air lens between the negative lens and the positive lens (21 and 22 or 21' and 22') of the second lens group-a G2a. By satisfying conditional expression (3), the aberration (eccentric aberration) generated by the negative lens (21 or 21') of the second lens group-a G2a can be successfully corrected by the positive lens (22 or 22') of the second lens group-a G2a. Such advantageous effects can be exhibited more significantly by satisfying the conditional expression (3').

If the value of (R212−R221)/(R212+R221) exceeds the upper limit defined by the conditional expression (3), the aberration (eccentric aberration) generated by the negative lens (21 or 21') of the second lens group-a G2a is excessively corrected by the positive lens (22 or 22') of the second lens group-a G2a.

If the value of (R212−R221)/(R212+R221) falls below the lower limit defined by the conditional expression (3), the positive lens (22 or 22') of the second lens group-a G2a fails to correct the aberration (eccentric aberration) generated by the negative lens (21 or 21') of the second lens group-a G2a.

Conditional expressions (4) and (4') defines the ratio of the distance between the negative lens (21 or 21') and the positive lens (22 or 22') of the second lens group-a G2a along the optical axis, with respect to the thickness of the second lens group-a G2a along the optical axis. By satisfying conditional expression (4), various aberrations (eccentric aberrations) are successfully corrected while obtaining a latitude in shaping the negative lens (21 or 21') and the positive lens (22 or 22') of the second lens group-a G2a. Such advantageous effects can be exhibited more significantly by satisfying the conditional expression (4').

If the value of Da/D2a exceeds the upper limit defined by the conditional expression (4), the latitude in shaping the negative lens (21 or 21') and the positive lens (22 or 22') of the second lens group-a G2a decreases, and the second lens group-a G2a fails to correct various aberrations, thus increasing the eccentric aberrations generated by the correction of image blur.

If the value of Da/D2a falls below the upper limit defined by the conditional expression (4), the aberration generated by the image-side surface of the negative lens (21 or 21') and the object-side surface of the positive lens (22 or 22') of the second lens group-a G2a increases, and the second lens group-a G2a fails to sufficiently correct various aberrations. Thus, the eccentric aberration generated by the correction of image blur increases.

Conditional expressions (5) and (5') define the ratio of the focal length of the negative lens (21 or 21') with respect to the focal length of the positive lens (22 or 22') of the second lens group-a G2a. By satisfying conditional expression (5), the aberration generated by the negative lens (21 or 21') of the second lens group-a G2a can be successfully corrected by the positive lens (22 or 22') of the second lens group-a G2a. Such advantageous effects can be exhibited more significantly by satisfying the conditional expression (5').

If the value of f21/f22 exceeds the upper limit defined by the conditional expression (5), the positive lens (22 or 22') of the second lens group-a G2a fails to correct the aberration generated by the negative lens (21 or 21') of the second lens group-a G2a.

If the value of f21/f22 falls below the lower limit defined by the conditional expression (5), the aberration generated by the negative lens (21 or 21') of the second lens group-a G2a is excessively corrected by the positive lens (22 or 22') of the second lens group-a G2a.

In the zoom lens system according to an embodiment, the second lens group-a G2a is stationary with respect to the image plane I (no movement along the optical axis) during a change in the focus from the short focal length end to the long focal length end to change magnification power. In other words, in the first, second, sixth, and seventh numerical examples, both the second lens group-a G2a and the second lens group-b G2b are stationary with respect to the image plane I. In the third to fifth numerical examples, the second lens group-a G2a is stationary with respect to the image plane I, and the second lens group-b G2b is movable along the optical axis. By making the second lens group-a G2a, which is the image-blur correcting lens group, stationary with respect to the image plane I during the change in the magnification of the zoom lens system, the mechanism for driving the correction of image blur is simplified, and the size of the apparatus is reduced. In addition, the tilting of the image-blur correcting lens group, which is likely to occur during the correction of image blur, is substantially prevented, and the eccentric aberration generated by the correction of image blur is successfully corrected.

In the zoom lens system according to an embodiment, the rear lens group includes a lens group having positive refractive power and lens groups having negative refractive power in that order from the object side. The lens groups having the negative refractive power constitute a focusing lens group that is movable during the focusing of the zoom lens system.

Specifically, in the first to fifth, and seventh numerical examples, the fourth lens group G4 having the negative refractive power constitutes the focusing lens group. In the sixth numerical example, the fifth lens group G5 having the negative refractive power constitutes the focusing lens group. In either case, the focusing lens group includes, in order from the object side, the positive lens having a convex surface facing the image side and the negative lens having a concave surface facing the object side. This configuration provides a simple structure of the focusing lens group while successfully correcting the fluctuations in aberration due to a change in the distance to an object.

In order for the zoom lens system to focus closer, there is a need to increase the amount of shift of the position of an image, with respect to the amount of movement of the focusing lens group. By disposing the focusing lens group having the negative refractive power on the image side relative to the lens group having the positive refractive power, the amount of shift in the position of the image is increased with respect to the amount of movement of the focusing lens group.

In the zoom lens system according to an embodiment, all the lenses used are spherical lenses (no aspherical lenses are used). This configuration reduces the cost for lenses, and prevents blurring due to cutting marks in aspherical surfaces. Further, by using aspherical lenses, various aberrations can be further corrected.

Conditional expressions (6) and (6') define the relation between the magnification power of the second lens group-a G2a and the magnification power of the lens groups on the image side relative to the second lens group-a G2a when the zoom lens system is focused at the long focal length end. By satisfying the conditional expression (6), a suitable amount of correction for the image blur (a suitable sensitivity of antivibration) by the second lens group-a G2a can be set, and the size of the zoom lens system can also be reduced. Further, various aberrations such as eccentric aberration and eccentric coma aberration can be successfully corrected.

Such advantageous effects can be exhibited more significantly by satisfying the conditional expression (6').

If the value of (1−b2a_1)bb_1 exceeds the upper limit defined by the conditional expression (6), the sensitivity of antivibration of the second-a group G2a becomes too low, which increases the amount of correction for image blur to be done by the second lens group-a G2a. Thus, the zoom lens system might be upsized. In addition, the second lens group-a G2a might intercept peripheral light during the correction of image blur, which adversely reduces the ratio of amount of peripheral light at the long focal length end.

If the value of (1−b2a_1)bb_1 falls below the lower limit defined by the conditional expression (6), the sensitivity of antivibration of the second lens group-a G2a becomes too high. Accordingly, the second lens group-a G2a, which includes two lenses (negative lens 21/21' and the positive lens 22/22'), might fail to correct the various aberrations (eccentric aberration and eccentric coma aberration).

As described above, the zoom lens system according to an embodiment includes the focusing lens group that is movable during the focusing. Conditional expression (7) defines the relation the magnification power of the focusing lens group and the magnification power of the lens groups on the image side relative to the focusing lens group. By satisfying conditional expression (7), the amount of shift in the position of an image with respect to the amount of movement of the focusing lens group successfully increases, and the fluctuations in aberrations is substantially prevented.

If the value of $(1-bfoc\_1^2)bfocb\_1^2$ exceeds the upper limit defined by the conditional expression (7), the amount of shift in the position of an image adversely decreases with respect to the amount of movement of the focusing lens group.

If the value of $(1-bfoc\_1^2)bfocb\_1^2$ falls below the lower limit defined by the conditional expression (7), it is difficult to substantially prevent the fluctuations in aberration during the focusing.

Conditional expression (8) defines the ratio of the focal length of the first lens group G1 with respect to the focal length of the entirety of the zoom lens system when the zoom lens system is focused at the short focal length end. By satisfying the conditional expression (8), the size of the zoom lens system can be reduced (the total length of the zoom lens is reduced), and the fluctuations in aberrations are effectively reduced or eliminated during the change in the magnification power.

If the value of f1/f_s exceeds the upper limit defined by the conditional expression (8), the focal length of the first lens group G1 becomes too long, and the amount of movement of the first lens group G1 during the change in the magnification power. As a result, the zoom lens system is upsized (the total length of the zoom lens system adversely increases).

If the value of f1/f_s falls below the lower limit defined by the conditional expression (8), the focal length of the first lens group G1 becomes too short, and it is difficult to reduce or eliminate the fluctuations in aberrations during the change in the magnification power. Conditional expression (9) defines the ratio of the distance between the lens surface closest to an object (the object side) and the image plane I, with respect to the focal length of the entirety of the zoom lens system when the zoom lens system is focused at the long focal length end. By satisfying the conditional expression (9), the size of the zoom lens system is reduced (the total length of the zoom lens system is reduced), and various aberrations are corrected.

If the value of TL_1/f_1 exceeds the upper limit of conditional expression (9), the total length of the zoom lens system become too long, and the zoom lens system is upsized.

If the value of TL_1/f_1 falls below the upper limit of conditional expression (9), the total length of the zoom lens system become too short, and it becomes difficult to correct various aberrations.

The following specifically describes numerical examples 1 through 7. In the aberration diagrams, the broken lines in the spherical aberration indicates the sine condition. In astigmatism, the solid lines and the alternate long and short dashed lines indicate sagittal, and the broken line and the alternate long and two short dashed lines indicate meridional. In addition, the solid lines and the broken lines indicate the d-line, and the alternate long and short dashed lines indicate the g-line.

In the various aberration diagrams and Tables, FNO. denotes the F-number, Y denotes the image height, BF denotes the back focus, R denotes the radius of curvature, D denotes the lens thickness or the distance between lenses, N denotes the refractive index with respect to the d-line, ν denotes the Abbe number with respect to the d-line, and φ denotes the maximum effective diameter of light rays. The back focus is a distance from the lens surface closest to the image within the entirety of the zoom lens system to the designed image plane I.

In the figures, the values for each of the F number, the back focus, and the distance d between lenses that is variable with a change in the focus are listed for the short focal length end, the intermediate focal length, and the long focal length end in that order. The unit of length is millimeter (mm).

First Numerical Example

FIGS. 1 to 4 and Tables 1 to 3 in FIGS. 31 to 33 pertain to the zoom lens system according to the first numerical example.

FIG. 1 is a diagram of a lens configuration. FIG. 2 is a collection of diagrams of various aberrations when the zoom lens system is focused at the short focal length end. FIG. 3 is a collection of diagrams of various aberrations when the zoom lens system is focused at the intermediate focal length. FIG. 4 is a collection of diagrams of various aberrations when the zoom lens system is focused at the long focal length end. Table 1 in FIG. 31 indicates data regarding lens surfaces, Table 2 in FIG. 32 indicates various data, and Table 3 in FIG. 33 indicates data regarding conditional expressions.

The zooming optical system according the first numerical example includes a first lens group G1 having positive refractive power; a second lens group G2 having negative refractive power; a third lens group G3 having positive refractive power; a fourth lens group G4 having negative refractive power; and a fifth lens group G5 having negative refractive power in that order from the object side. The third lens group G3, the fourth lens group G4, and the fifth lens group G5 constitute a rear lens group. The second lens group G2 includes a second lens group-a G2a having negative refractive power and a second lens group-b G2b having negative refractive power, which are arranged in that order from the object side.

In the zoom lens system according to the first example, the distance between the second lens group-a G2a and the second lens group-b G2b is stationary during a change in the focus from the short focal length end to the long focal length end to change the magnification power. The zoom lens system according to the first numerical example has a configuration of a five-group zoom lens having positive, negative, positive, negative, and negative power arranged in that order.

The first lens G1 includes a positive meniscus lens 11 with a convex surface facing the object side, a negative meniscus lens 12 with a convex surface facing the object side, and a positive meniscus lens 13 with a convex surface facing the object side arranged in that order from the object side. The negative meniscus lens 12 and the positive meniscus lens 13 are cemented to each other.

The second lens group G2 includes a negative meniscus lens 21 with a convex surface facing the object side and a positive meniscus lens 21 with a convex surface facing the object side arranged in that order from the object side.

The second lens group-b G2b includes a biconvex positive lens 23, a biconcave negative lens 24, and a negative meniscus lens with a convex surface facing the image side arranged in that order from the object side.

The third lens group G3 includes an aperture stop S, a biconvex positive lens 31, a biconvex positive lens 32, a negative meniscus lens 33 with a convex surface facing the image side, a negative meniscus lens 34 with a convex surface facing the object side, a biconvex positive lens 35, and a biconvex positive lens 36, which are arranged in that order from the object side. The biconvex positive lens 32 and the negative meniscus lens 33 are cemented to each other, and the negative meniscus lens 34 and the biconvex positive lens 35 are cemented to each other.

The fourth lens group G4 includes a biconvex positive lens 41 and a biconcave negative lens 42 arranged in that order from the object side.

The fifth lens group G5 includes a negative meniscus lens 51 with a convex surface facing the image side and a biconvex positive lens 52 arranged in that order from the object side.

Second Numerical Example

FIGS. 5 to 8 and Tables 4 to 6 in FIGS. 34 to 36 pertain to the zoom lens system according to the second numerical example.

Figure 5:
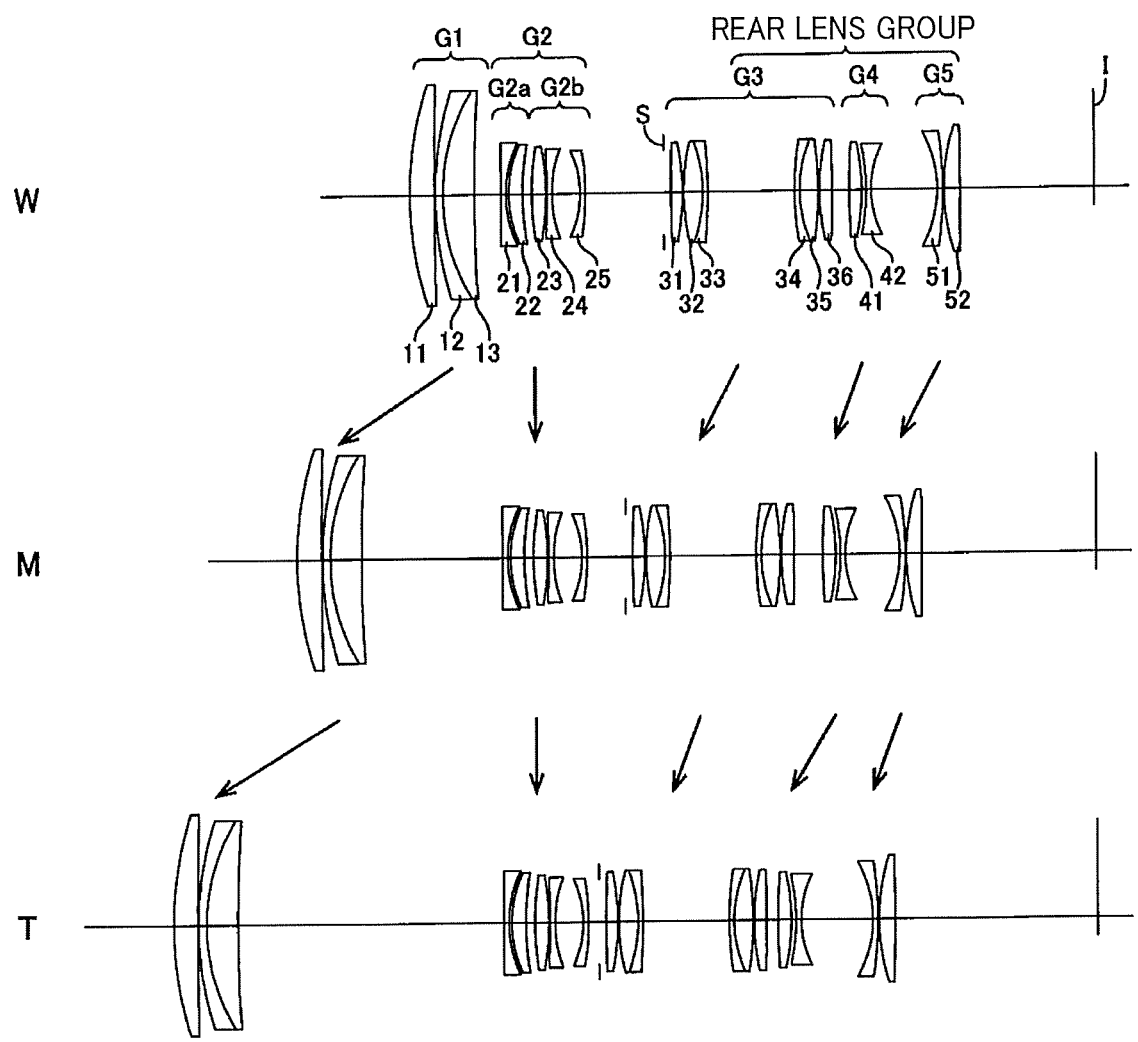
FIG. 5 is an illustration of the configuration of a zoom lens system according to a second numerical example.

FIG. 5 is a diagram of a lens configuration. FIG. 6 is a collection of diagrams of various aberrations when the zoom lens system is focused at the short focal length end. FIG. 7 is a collection of diagrams of various aberrations when the zoom lens system is focused at the intermediate focal length. FIG. 8 is a collection of diagrams of various aberrations when the zoom lens system is focused at the long focal length end.

Table 4 in FIG. 34 indicates data regarding lens surfaces, Table 5 in FIG. 35 indicates various data, and Table 6 in FIG. 36 indicates data regarding conditional expressions.

The zoom lens system according to the second numerical example is the same as the zoom lens system according to the first numerical example except for the following points.

(1) The fifth lens group G5 has positive refractive power instead of negative refractive power. For this reason, the zoom lens system according to the second numerical example has a configuration of a five-group zoom lens having positive, negative, positive, negative, and positive power arranged in that order from the object side.

(2) The negative lens 21 of the second lens group G2 is not a negative meniscus lens but a biconcave negative lens.

(3) The negative lens 33 of the third lens group G3 is not a negative meniscus lens but a biconcave negative lens.

Third Numerical Example

Figure 9:
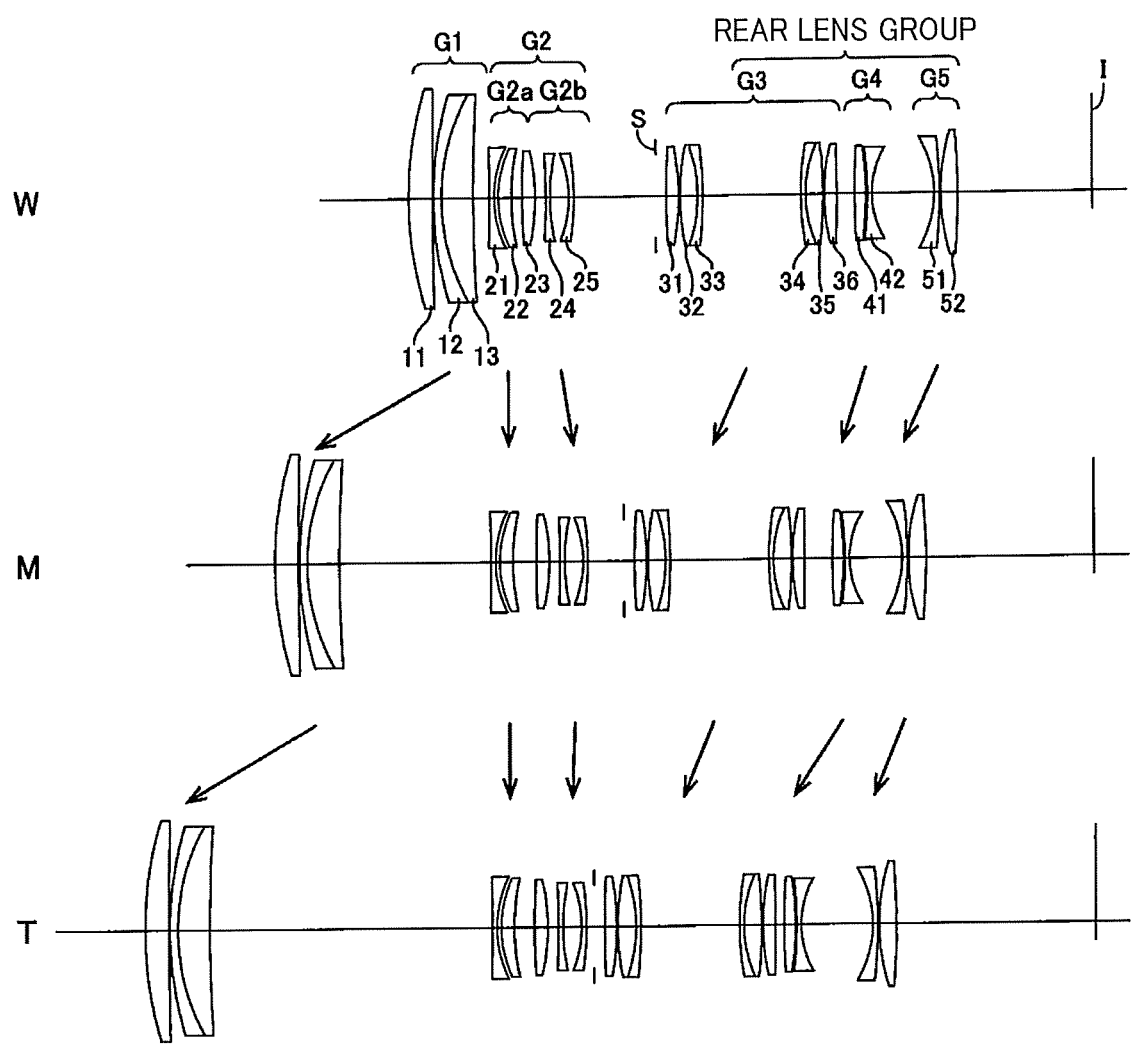
FIG. 9 is an illustration of the configuration of a zoom lens system according to a third numerical example.

FIGS. 9 to 12 and Tables 7 to 9 in FIGS. 37 to 39 pertain to the zoom lens system according to the third numerical example. FIG. 9 is a diagram of a lens configuration. FIG. 10 is a collection of diagrams of various aberrations when the zoom lens system is focused at the short focal length end. FIG. 11 is a collection of diagrams of various aberrations when the zoom lens system is focused at the intermediate focal length. FIG. 12 is a collection of diagrams of various aberrations when the zoom lens system is focused at the long focal length end. Table 7 in FIG. 37 indicates data regarding lens surfaces, Table 8 in FIG. 38 indicates various data, and Table 9 in FIG. 39 indicates data regarding conditional expressions.

The zoom lens system according to the third numerical example is the same as the zoom lens system according to the first numerical example except for the following points.

(1) The fifth lens group G5 has positive refractive power instead of negative refractive power. Further, the distance between the second lens group-a G2a and the second lens group-b G2b changes with a change in the focus from the short focal length end to the long focal length end to change the magnification power. For this reason, the zoom lens system according to the third numerical example has a configuration of a six-group zoom lens having positive, negative, negative, positive, negative, and positive power arranged in that order from the object side.

(2) The negative lens 21 of the second lens group G2 is not a negative meniscus lens but a biconcave negative lens.

Fourth Numerical Example

Figure 13:
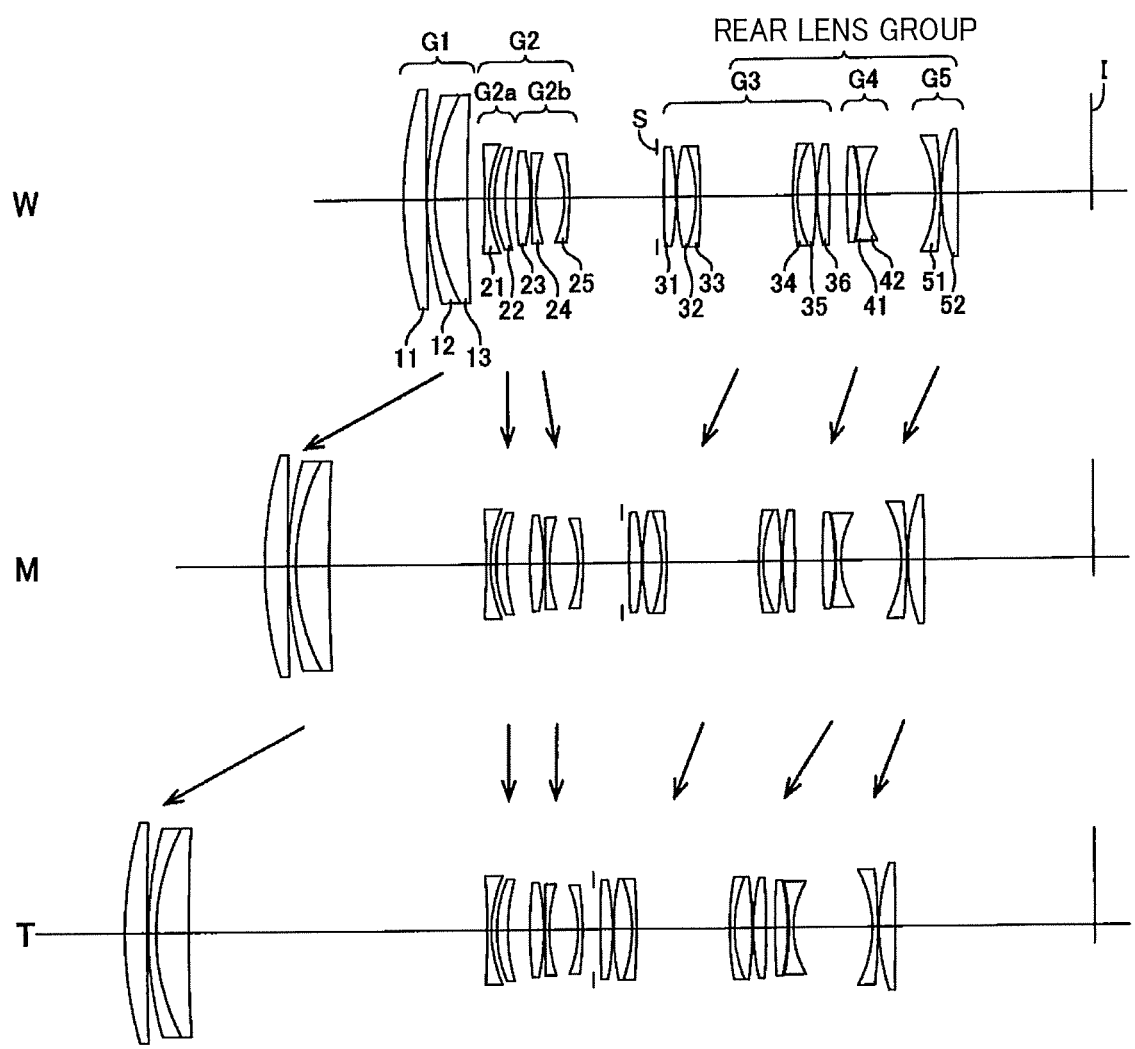
FIG. 13 is an illustration of the configuration of a zoom lens system according to a fourth numerical example.

FIGS. 13 to 16 and Tables 10 to 12 in FIGS. 40 to 42 pertain to the zoom lens system according to the fourth numerical example. FIG. 13 is a diagram of a lens configuration. FIG. 14 is a collection of diagrams of various aberrations when the zoom lens system is focused at the short focal length end. FIG. 15 is a collection of diagrams of various aberrations when the zoom lens system is focused at the intermediate focal length. FIG. 16 is a collection of diagrams of various aberrations when the zoom lens system is focused at the long focal length end. Table 10 in FIG. 40 indicates data regarding lens surfaces, Table 11 in FIG. 41 indicates various data, and Table 12 in FIG. 42 indicates data regarding conditional expressions.

The zoom lens system according to the fourth numerical example has the same configuration as that of the zoom lens system according to the first numerical example, except for the following points: (1) the distance between the second lens group-a G2a and the second lens group-b G2b changes with a change in the focus from the short focal length end to the long focal length end to change the magnification power. For this reason, the zoom lens system according to the fourth numerical example has a configuration of a six-group zoom lens having positive, negative, negative, positive, negative, and negative power arranged in that order from the object side. (2) The negative lens 21 of the second lens group G2 is a biconcave negative lens, instead of a negative meniscus lens. The negative lens 24 of the second lens group G2 is a negative meniscus lens having a convex surface facing the object side, instead of a biconcave negative lens.

Fifth Numerical Example

Figure 17:
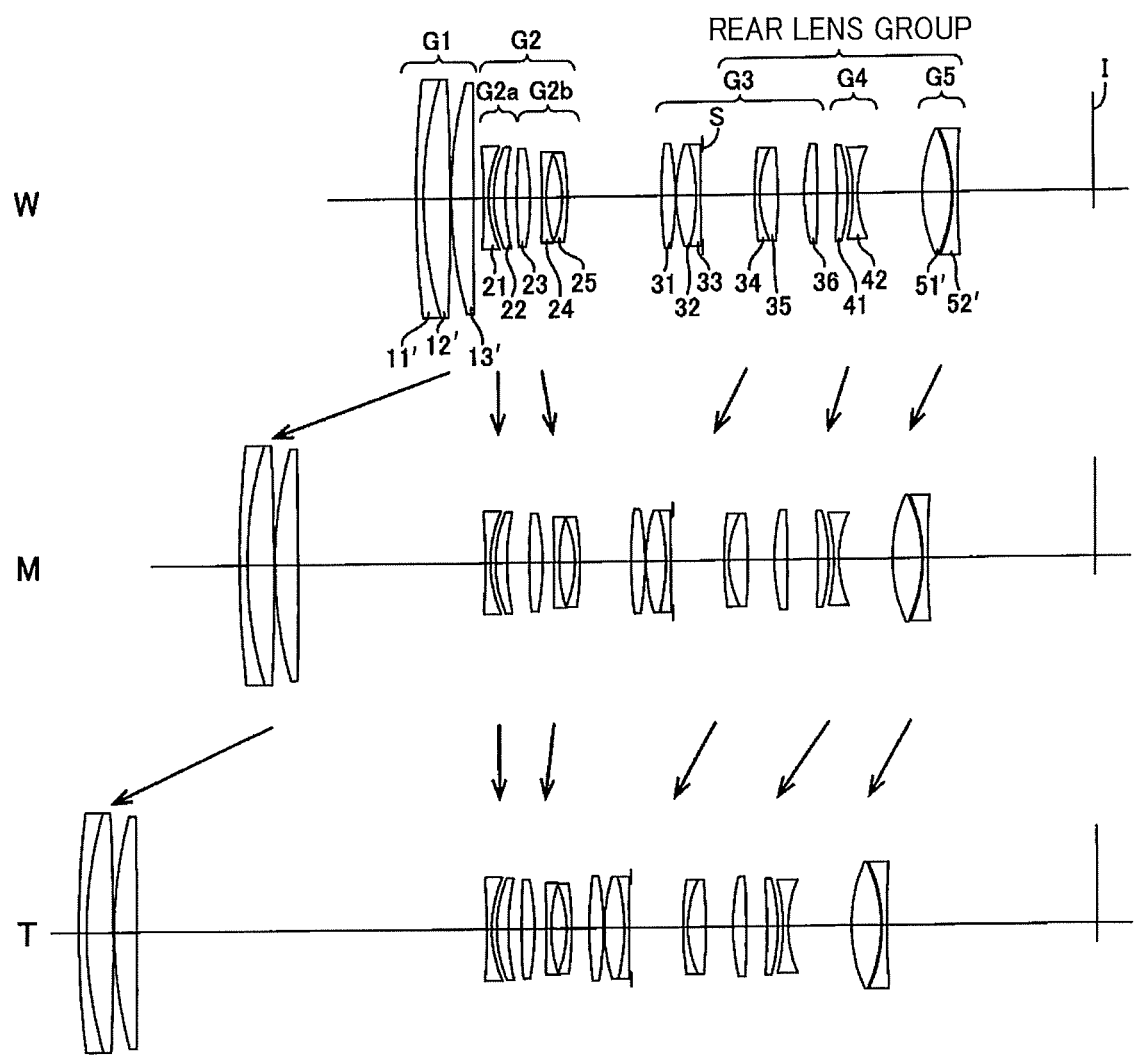
FIG. 17 is an illustration of the configuration of a zoom lens system according to a fifth numerical example.

FIGS. 17 to 20 and Tables 13 to 15 in FIGS. 43 to 45 pertain to the zoom lens system according to the fifth numerical example. FIG. 17 is a diagram of a lens configuration. FIG. 18 is a collection of diagrams of various aberrations when the zoom lens system is focused at the short focal length end. FIG. 19 is a collection of diagrams of various aberrations when the zoom lens system is focused at the intermediate focal length. FIG. 20 is a collection of diagrams of various aberrations when the zoom lens system is focused at the long focal length end. Table 13 in FIG. 43 indicates data regarding lens surfaces, Table 14 in FIG. 44 indicates various data, and Table 15 in FIG. 45 indicates data regarding conditional expressions.

The zoom lens system according to the fifth numerical example is the same as the zoom lens system according to the first numerical example except for the following points.

(1) The fifth lens group G5 has positive refractive power instead of negative refractive power. Further, the distance between the second lens group-a G2a and the second lens group-b G2b changes with a change in the focus from the short focal length end to the long focal length end to change the magnification power. For this reason, the zoom lens system according to the fifth numerical example has a configuration of a six-group zoom lens having positive, negative, negative, positive, negative, and positive power arranged in that order from the object side.

(2) The first lens group G1 includes a negative meniscus lens 11' having a convex surface facing the object side, a biconvex positive lens 12', and a biconvex positive lens 13' arranged in that order from the object side. The negative meniscus lens 11' and the biconvex positive lens 12' are cemented to each other.

(3) The negative lens 21 of the second lens group G2 is not a negative meniscus lens but a biconcave negative lens. A stationary stop is disposed in immediately front of the biconcave negative lens 21.

(4) The negative lens 33 of the third lens group G3 is not a negative meniscus lens but a biconcave negative lens. The aperture stop S of the third lens group G3 is disposed not immediately in front of the biconvex positive lens 31, but between the biconcave negative lens 33 and the negative meniscus lens 34 (immediately at the back of the biconcave negative lens 33).

(5) The positive lens 41 of the fourth lens group G4 is not a biconvex positive lens but a positive meniscus lens having a convex surface facing the image side.

(6) The fifth lens group G5 includes a biconvex positive lens 51' and a biconcave negative lens 52' arranged in that order from the object side.

Sixth Numerical Example

Figure 21:
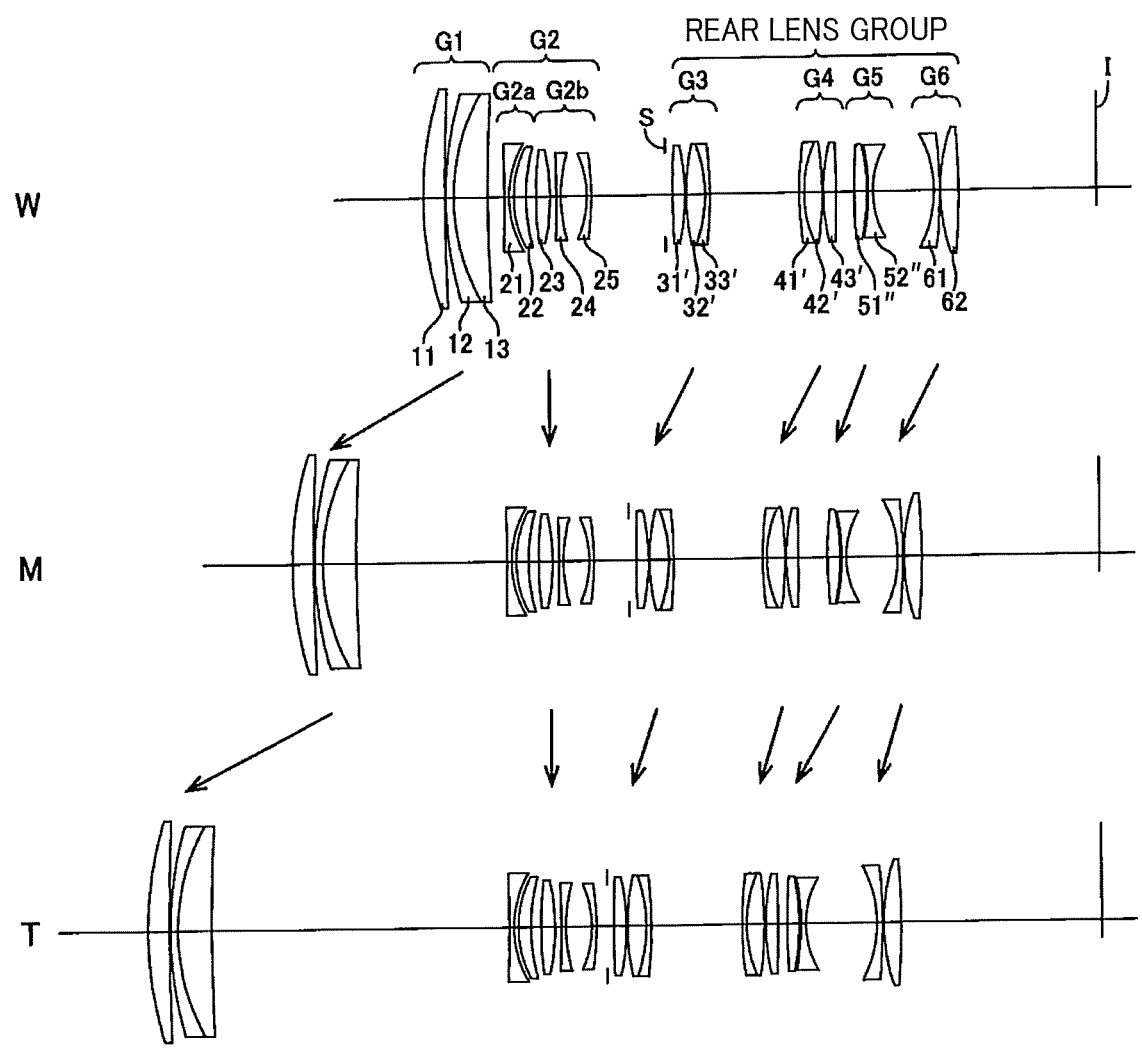
FIG. 21 is an illustration of the configuration of a zoom lens system according to a sixth numerical example.

FIGS. 21 to 24 and Tables 16 to 18 in FIGS. 46 to 48 pertain to the zoom lens system according to the sixth numerical example. FIG. 21 is a diagram of a lens configuration. FIG. 22 is a collection of diagrams of various aberrations when the zoom lens system is focused at the short focal length end. FIG. 23 is a collection of diagrams of various aberrations when the zoom lens system is focused at the intermediate focal length. FIG. 24 is a collection of diagrams of various aberrations when the zoom lens system is focused at the long focal length end. Table 16 in FIG. 46 indicates data regarding lens surfaces, Table 17 in FIG. 47 indicates various data, and Table 18 in FIG. 48 indicates data regarding conditional expressions.

The zooming optical system according the sixth numerical example includes a first lens group G1 having positive refractive power; a second lens group G2 having negative refractive power; a third lens group G3 having positive refractive power; a fourth lens group G4 having positive refractive power; a fifth lens group G5 having negative refractive power; and a sixth lens group G6 having positive refractive power, arranged in that order from the object side. The third lens group G3, the fourth lens group G4, the fifth lens group G5, and the sixth lens group G6 constitute a rear lens group. The second lens group G2 includes a second lens group-a G2a having negative refractive power and a second lens group-b G2b having negative refractive power, which are arranged in that order from the object side.

In the zoom lens system according to the sixth numerical example, the distance between the second lens group-a G2a and the second lens group-b G2b is stationary during a change in the focus from the short focal length end to the long focal length end to change the magnification power. For this reason, the zoom lens system according to the sixth numerical example has a configuration of a six-group zoom lens having positive, negative, positive, positive, negative, and positive power arranged in that order from the object side.

The first lens G1 includes a positive meniscus lens 11 with a convex surface facing the object side, a negative meniscus lens 12 with a convex surface facing the object side, and a positive meniscus lens 13 with a convex surface facing the object side arranged in that order from the object side. The negative meniscus lens 12 and the positive meniscus lens 13 are cemented to each other.

The second lens group G2 includes a biconcave negative lens 21 and a positive meniscus lens 22 with a convex surface facing the object side arranged in that order from the object side.

The second lens group-b G2b includes a biconvex positive lens 23, a biconcave negative lens 24, and a negative meniscus lens 25 with a convex surface facing the image side arranged in that order from the object side.

The third lens group G3 includes an aperture stop S, a biconvex positive lens 31', a biconvex positive lens 32', and a negative meniscus lens 33' having a convex surface facing the image side, which are arranged in that order from the object side. The biconvex positive lens 32' and the negative meniscus lens 33' are cemented to each other.

The fourth lens group G4 includes a negative meniscus lens 41' having a convex surface facing the object side, a biconvex positive lens 42', and a biconvex positive lens 43' arranged in that order from the object side. The negative meniscus lens 41' and the biconvex positive lens 42' are cemented to each other.

The fifth lens group G5 includes a biconvex positive lens 51" and a biconcave negative lens 52" arranged in that order from the object side.

The sixth lens group G6 includes a negative meniscus lens 61 with a convex surface facing the image side and a biconvex positive lens 62 arranged in that order from the object side.

Seventh Numerical Example

Figure 25:
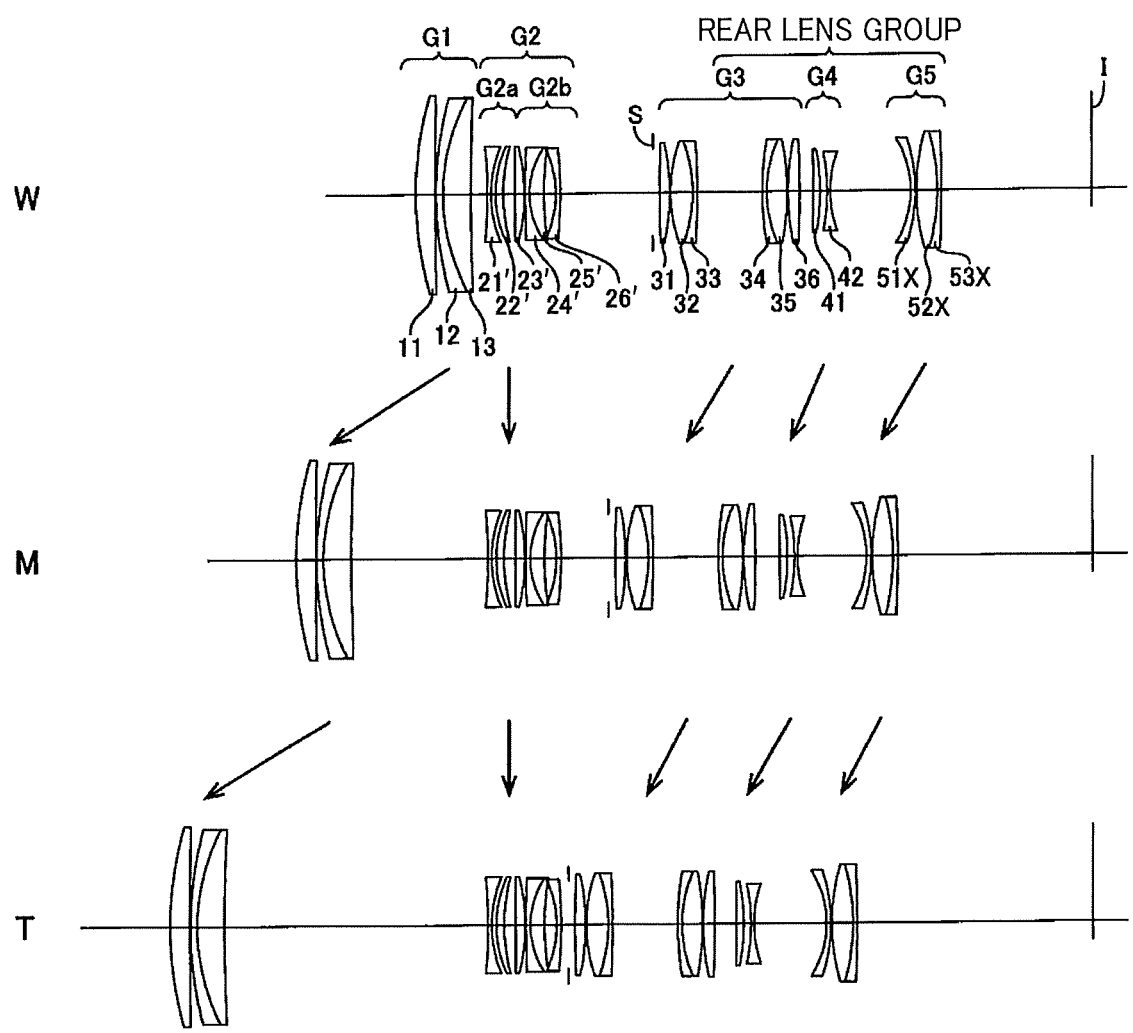
FIG. 25 is an illustration of the configuration of a zoom lens system according to a seventh numerical example.

FIGS. 25 to 28 and Tables 19 to 21 in FIGS. 49 to 51 pertain to the zoom lens system according to the seventh numerical example. FIG. 25 is a diagram of a lens configuration. FIG. 26 is a collection of diagrams of various aberrations when the zoom lens system is focused at the short focal length end. FIG. 27 is a collection of diagrams of various aberrations when the zoom lens system is focused at the intermediate focal length. FIG. 28 is a collection of diagrams of various aberrations when the zoom lens system is focused at the long focal length end. Table 19 in FIG. 49 indicates data regarding lens surfaces, Table 20 in FIG. 50 indicates various data, and Table 21 in FIG. 51 indicates data regarding conditional expressions.

The zoom lens system according to the seventh numerical example is the same as the zoom lens system according to the first numerical example except for the following points.

(1) The fifth lens group G5 has positive refractive power instead of negative refractive power. For this reason, the zoom lens system according to the second numerical example has a configuration of a five-group zoom lens having positive, negative, positive, negative, and positive power arranged in that order from the object side.

(2) The second lens group G2 includes a biconcave negative lens 21' and a positive meniscus lens 22' with a convex surface facing the object side arranged in that order from the object side.

(3) The second lens group-b G2b includes a biconvex positive lens 23', a negative meniscus lens 24' with a convex surface facing the object side, a positive meniscus lens 25' with a convex surface facing the object side, and a negative meniscus lens 26' with a convex surface facing the image side. The negative meniscus lens 24' and the positive meniscus lens 25' are cemented to each other.

(4) The positive lens 41 of the fourth lens group G4 is not a biconvex positive lens but a positive meniscus lens with a convex surface facing the image side.

(5) The fifth lens group G5 includes a negative meniscus lens 51X with a convex surface facing the image side, a biconvex positive lens 52X, and a negative meniscus lens 53X with a convex surface facing the image side, which are arranged in that order from the object side. The biconvex positive lens 52X and the negative meniscus lens 53X are cemented to each other.

In the zoom lens system according to the first to seventh numerical examples, various aberrations are corrected at a high level. Particularly, spherical aberration and axial chromatic aberration are corrected to a very small level. In addition, astigmatism, curvature of field, and lateral chromatic aberration are also corrected to a sufficiently small level, and the coma aberration and its fluctuations in the color difference are well reduced in an area up to the extreme periphery of angle of view. Further, the distortion is reduced 3% or less, which is expressed by the absolute value.

Further, the half angle of view is about 17° at the short focal length end and about 4° at the long focal length end. The F-number is about 4.5 at the short focal length end and about 5.6 at the long focal length end. While having such values, the reduction in the size of apparatus is achieved, and a very favorable image performance is provided.

Figure 29A:
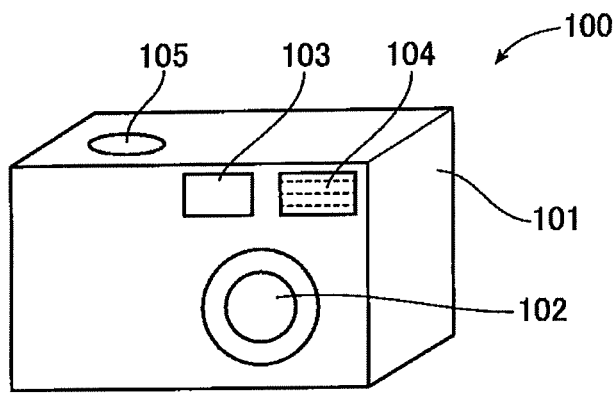
FIGS. 29A and 29B are illustrations of a first example of an imaging apparatus provided with the zoom lens system according to an embodiment.
Figure 29B:
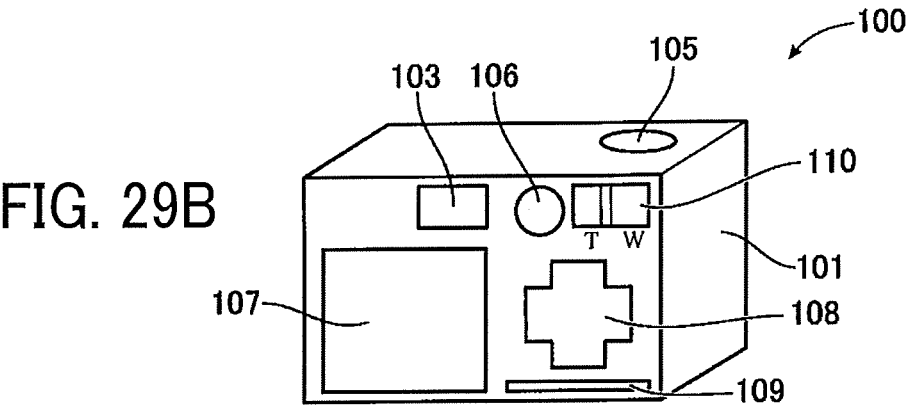
Figure 30:
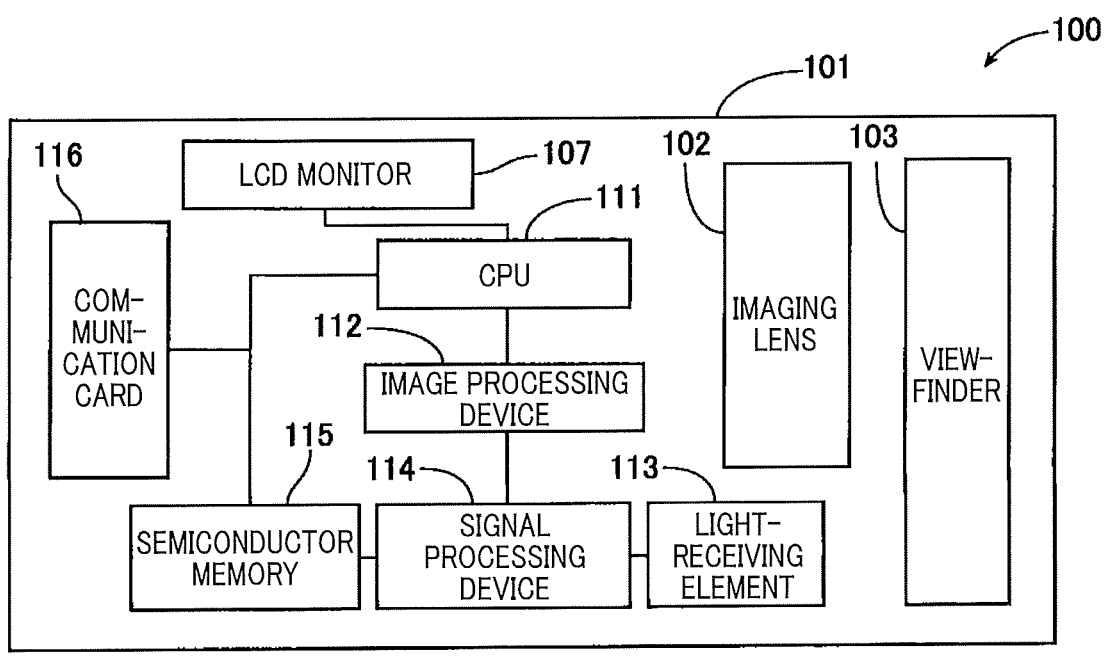
FIG. 30 is an illustration of a second example of an imaging apparatus provided with the zoom lens system according to an embodiment.

With reference to FIGS. 29 and 30, a digital camera 100 (imaging apparatus) equipped with the zoom lens system according to an embodiment is described. The digital camera 100 achieves a reduction in size because the image-blur correcting lens group is lightweight while being a telecamera with a half angle of view of approximately 4 degrees at the long focal length end. Further, the digital camera 100 is capable of correcting various aberration successfully while having resolution corresponding to an image sensor of, for example, 30 million pixels or more.

The digital camera 100 includes a camera body (casing) 101, an imaging lens 102, a viewfinder 103, a flash 104, a shutter button 105, a power button 106, a liquid crystal monitor 107, an operation button 108, and a memory card slot 109, a zoom switch 110.

The camera body 101 houses the elements of the digital camera 100. The imaging lens 102 is, for example, a unit in which the zoom lens system according to the present embodiment is incorporated into a lens barrel. The viewfinder 103 is a viewing window for determining the subject and the composition. The flash 104 emits a flash when shooting at night or shooting in a dark place. The shutter button 105 is a physical switch for performing shooting with the digital camera 100. The power button 106 is a physical switch for switching the power of the digital camera 100 on and off. The liquid crystal monitor 107 displays, for example, an image captured by the digital camera 100. The operation button 108 is a physical switch for setting a shooting (imaging) mode or the like of the digital camera 100. A memory card slot 109 is a slot for inserting a memory card for storing, for example, an image captured by the digital camera 100. The zoom switch 110 is a physical switch for performing changing a focus (zooming) between the short focal length end and the long focal length end. By operating the zoom switch 110, the distance between the lens groups of the zoom lens system according to the present embodiment is appropriately changed.

Further, the digital camera 100 further includes a central processing unit (CPU) 111, an image processor 112, a light receiving element 113, a signal processor 114, a semiconductor memory 115, and a communication card 116, which are constituent elements within a camera body 101.

The CPU 111 performs various types of arithmetic processing inside the digital camera 100. The image processor 112 performs various types of image processing on an image captured by the digital camera 100. The light receiving element 113 takes in and receives external light used for photometric processing. The signal processor 114 performs various signal processing such as a shooting instruction signal and an image processing signal. The semiconductor memory 115 constitutes a temporary storage area for an image captured by the digital camera 100. The communication card 116 is used for enabling wireless communication with an external device.

This configuration of the digital camera 100 is only one example, and various design changes are possible (there is a latitude in the specific aspect of the digital camera 100).

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A zoom lens system comprising: a first lens group having positive refractive power; a second lens group having negative refractive power; and a rear group, the first lens group, the second lens group and the rear group being arranged in that order from an object side,
    the second lens group consisting essentially of a second lens group-a having negative refractive power and a second lens group-b having negative refractive power arranged in that order from the object side,
    the second lens group-a consisting essentially of a negative lens and a positive lens arranged in that order from the object side,
    the second lens group-a being configured to move to include a component in a direction vertical to an optical axis of the zoom lens system, and
    the rear lens group consisting essentially of an aperture stop, and at least two lens groups, wherein during a change in a focus from a short focal length end to a long focal length end to change a magnification power, a distance between the first lens group and the second lens group-a increases, a distance between the second lens group-a and the second lens group-b is changeable or stationary, a distance between the second lens group-b and the rear lens group decreases, and the second lens group-b is stationary in the direction vertical to the optical axis of the zoom lens system.

2. The zoom lens system according to claim 1, wherein conditional expression (1) below is satisfied:

$$-1.5 < (1-b2a\_s)bb\_s < -0.7 \quad (1)$$

where b2a_s denotes magnification power of the second lens group-a at the short focal length end; and bb_s denotes composite lateral magnification power of all lens groups on the image side relative to the second lens group-a at the short focal length end.

3. The zoom lens system according to claim 1, wherein conditional expression (2) below is satisfied:

$$0.3 < f2a/f2b < 2.5 \quad (2)$$

where f2a denotes focal length of the second lens group-a; and
f2b denotes focal length of the second lens group-b.

4. The zoom lens system according to claim 1, wherein the negative lens of the second lens group-a has a concave surface facing an image side, and the positive lens of the second-a group has a convex surface facing the object side.

5. The zoom lens system according to claim 1, wherein conditional expression (3) below is satisfied:

$$-0.2 < (R212-R221)/(R212+R221) < 0.2 \quad (3)$$

where

R212 denotes radius of curvature of an image-side surface of the negative lens of the second lens group-a; and R221 denotes radius of curvature of an object-side surface of the positive lens of the second lens group-a.

6. The zoom lens system according to claim 1, wherein conditional expression (5) below is satisfied:

$$-0.7 < f21/f22 < -0.2 \quad (5)$$

where f21 denotes focal length of the negative lens of the second lens group-a; and f22 denotes focal length of the positive lens of the second lens group-a.

7. The zoom lens system according to claim 1, wherein the rear lens group includes a lens group having positive refractive power and a lens group having negative refractive power arranged in that order from the object side, and the lens group having the negative refractive power constitutes a focusing lens group that is movable during focusing of the zoom lens system.

8. The zoom lens system according to claim 1, wherein the rear lens group includes a third lens group having positive refractive power, a fourth lens group having negative refractive power, and a fifth lens group having negative refractive power arranged in that order from the object side.

9. The zoom lens system according to claim 1, wherein the rear lens group includes a third lens group having positive refractive power, a fourth lens group having negative refractive power, and a fifth lens group having positive refractive power arranged in that order from the object side.

10. The zoom lens system according to claim 1, wherein the rear lens group includes a third lens group having positive refractive power, a fourth lens group having positive refractive power, a fifth lens group having negative refractive power, and a sixth lens group having positive refractive power arranged in that order from the object side.

11. An imaging apparatus comprising the zoom lens system according to claim 1.

12. A zoom lens system comprising: a first lens group having positive refractive power; a second lens group having negative refractive power; and a rear group, the first lens group, the second lens group and the rear group being arranged in that order from an object side, the second lens group consisting essentially of a second lens group-a having negative refractive power and a second lens group-b having negative refractive power arranged in that order from the object side, the second lens group-a consisting essentially of a negative lens and a positive lens arranged in that order from the object side, the second lens group-a being configured to move to include a component in a direction vertical to an optical axis of the zoom lens system, and the rear lens group consisting essentially of an aperture stop, and at least two lens groups, wherein during a change in a focus from a short focal length end to a long focal length end to change a magnification power, a distance between the first lens group and the second lens group-a increases, a distance between the second lens group-a and the second lens group-b is changeable or stationary, a distance between the second lens group-b and the rear lens group decreases, and wherein conditional expression (4) below is satisfied:

$$0.01 < Da/D2a < 0.5 \quad (4)$$

where

Da denotes a distance between the negative lens and the positive lens of the second lens group-a along the optical axis; and D2a denotes a thickness of the second lens group-a along the optical axis.

13. A zoom lens system comprising: a first lens group having positive refractive power; a second lens group having negative refractive power; and a rear group, the first lens group, the second lens group and the rear group being arranged in that order from an object side, the second lens group consisting essentially of a second lens group-a having negative refractive power and a second lens group-b having negative refractive power arranged in that order from the object side, the second lens group-a consisting essentially of a negative lens and a positive lens arranged in that order from the object side, the second lens group-a being configured to move to include a component in a direction vertical to an optical axis of the zoom lens system, and the rear lens group consisting essentially of an aperture stop, and at least two lens groups, wherein during a change in a focus from a short focal length end to a long focal length end to change a magnification power, a distance between the first lens group and the second lens group-a increases, a distance between the second lens group-a and the second lens group-b is changeable or stationary, a distance between the second lens group-b and the rear lens group decreases, and the second lens group-a is stationary with respect to the image plane.

* * * * *